(12) United States Patent
Huang et al.

(10) Patent No.: US 11,172,212 B2
(45) Date of Patent: Nov. 9, 2021

(54) DECODER-SIDE REFINEMENT TOOL ON/OFF CONTROL

(71) Applicant: QUALCOMM Incorporated, San Diego, CA (US)

(72) Inventors: Han Huang, San Diego, CA (US); Wei-Jung Chien, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/892,714

(22) Filed: Jun. 4, 2020

(65) Prior Publication Data
US 2020/0389656 A1    Dec. 10, 2020

Related U.S. Application Data

(60) Provisional application No. 62/863,080, filed on Jun. 18, 2019, provisional application No. 62/858,094, filed on Jun. 6, 2019.

(51) Int. Cl.
*H04N 19/189* (2014.01)
*H04N 19/17* (2014.01)
*H04N 19/70* (2014.01)

(52) U.S. Cl.
CPC ........... *H04N 19/189* (2014.11); *H04N 19/17* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2018/0192071 A1* | 7/2018 | Chuang | H04N 19/517 |
| 2018/0249154 A1 | 8/2018 | Chuang et al. | |
| 2018/0278949 A1 | 9/2018 | Karczewicz et al. | |
| 2018/0278950 A1 | 9/2018 | Chen et al. | |
| 2020/0275112 A1* | 8/2020 | Chiang | H04N 19/159 |
| 2021/0029366 A1* | 1/2021 | Zhang | H04N 19/51 |
| 2021/0051339 A1* | 2/2021 | Liu | H04N 19/13 |

OTHER PUBLICATIONS

Chen C-Y., et al., "CE9-Related. Simplification of Cascading DMVR and BDOF processes," 14. JVET Meeting, Mar. 19, 2019-Mar. 27, 2019, Geneva, CH (The Joint Video Exploration Team of ISO/IEC JTC1/SC29/WG11 and ITU-T SG.16), No. JVET-N0097, Mar. 18, 2019 (Mar. 18, 2019), XP030255275, Retrieved from the Internet: URL:http://phenix.int-evry.fr/jvet/doc_end_user/documents/14_Geneva/wg11/JVET-N0097.zip. JVET-N0097 DraftText.docx [retrieved on Mar. 18, 2019].

(Continued)

*Primary Examiner* — Samuel D Fereja
(74) *Attorney, Agent, or Firm* — Shumaker & Sieffert, P.A.

(57) ABSTRACT

This disclosure describes techniques for enabling very precise on/off control of two or more different decoder-side refinement tools. Rather than merely allowing or enabling these tools for an entire video sequence of video data, this disclosure describes techniques for enabling or disabling different decoder-side refinement tools for subsets (or portions) of a video sequence.

32 Claims, 11 Drawing Sheets

(56) References Cited

OTHER PUBLICATIONS

Chen J., et al., "Algorithm Description of Joint Exploration Test Model 7 (JEM 7)", JVET-G1001-V1, Joint Video Exploration Team (JVET) of ITU-T SG 16 WP3 and ISO/IEC JTC 1/SC 29/WG 11, 7th Meeting, Jul. 13, 2017-Jul. 21, 2017, Torino, Aug. 19, 2017 (Aug. 19, 2017), XP030150980, 51 Pages, pages i-iv, Retrieved from the Internet URL: http://phenix.int-evry.fr/jvet/doc_end_user/documents/7_Torino/wg11/JVET-G0001-v1.zip.

Chujoh T., et al., "Non-CE9: On Conditions for DMVR and BDOF", 14. JVET Meeting, Mar. 19, 2019-Mar. 27, 2019, Geneva, CH (The Joint Video Exploration Team of ISO/IEC JTC1/SC29/WG11 and ITU-T SG.16), No. JVET-N0146-v1, Mar. 26, 2019 (Mar. 26, 2019), XP030204976, 5 pages, Retrieved from the Internet: URL: http://phenix.int-evry.fr/jvet/doc_end_user/documents/14_Geneva/wg11/JVET-N0146-v4.zip.JVET-N0146-v1.docx. [retrieved on Mar. 26, 2019].

International Search Report and Written Opinion—PCT/US2020/036338—ISA/EPO—dated Sep. 23, 2020, 16 pp.

Xiu (Interdigital) X., et al., "CE9-Related: Complexity Reduction and Bit-Width Control for Bi-Directional Optical Flow (BIO)", 12. JVET Meeting, Oct. 3, 2018-Oct. 12, 2018, Macao, CN (The Joint Video Exploration Team of ISO/IEC JTC1/SC29/WG11 and ITU-T SG.16), No. JVET-L0256-v2, Oct. 8, 2018 (Oct. 8, 2018), XP030251694, pp. 1-15, Retrieved from the Internet: URL:http://phenix.int-evry.fr/jvet/doc_end_user/documents/12_Macao/wg11/JVET-L0256-v3.zip. JVET-L0256-r2.docx [retrieved on Oct. 8, 2018].

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.

Bross et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020, Document: JVET-R2001-v3, 523 Pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.

Huang, H et al., "Non-CE9: DMVR and BDOF On/Off Control", JVET-O0250, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-6.

"Information technology—Coding of audio-visual objects, Part 10: Advanced Video Coding", ISO/IEC 14496-10, Second edition, Oct. 1, 2004, 280 pages.

ITU-R Recommendation ITU-R BT.2100-0, Image parameter values for high dynamic range television for use in production and international programme exchange International Telecommunication Union, Jul. 2016, 17 pp.

ITU-T H.222.0: "Series H: Audiovisual and Multimedia Systems, Infastructure of audiovisual services—Transmission multiplexing and synchronization, Information technology—Generic Coding of Moving Pictures and Associated Audio Information: Systems", The International Telecommunication Union. Feb. 2000, pp. 171.

ITU-T H.264, Series H: Audiovisual and Multimedia Systems, Infastructure of audiovisual services—Coding of moving video, Advanced video coding for generic audiovisual services, The International Telecommunication Union. Jun. 2011, 674 pp.

ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.

ITU-T H.320: "Series H: Audiovisual and Multimedia Systems, Infrastructure of Audiovisual Services—Systems and Terminal Equipment for Audiovisual Services, Narrow-band Visual Telephone Systems and Terminal Equipment", International Telecommunication Union, Mar. 2004, 34 Pages.

\* cited by examiner

DECODER-SIDE REFINEMENT TOOL ON/OFF CONTROL

This application claims the benefit of U.S. Provisional Application No. 62/858,094, filed Jun. 6, 2019, and U.S. Provisional Application No. 62/863,080, filed Jun. 18, 2019, the entire content each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In the development of the Versatile Video Coding (VVC) standard, several decoder-side motion refinement tools have been proposed and/or adopted into the standard in order to improve the compression efficiency. One example is bi-directional optical flow (BDOF), and another example tool is decoder-side motion vector refinement (DMVR). In general, this disclosure describes a number of different video encoding and decoding techniques, including techniques for decoder-side refinement tool on/off control.

More specifically, this disclosure describes techniques for enabling very precise on/off control of two or more different decoder-side refinement tools. Rather than merely allowing or enabling these tools for an entire video sequence of video data, this disclosure describes techniques for enabling or disabling different decoder-side refinement tools for subsets (or portions) of a video sequence. In this way, the techniques can provide more flexibility between competing goals of reducing decoding complexity and increasing compression efficiency in different video applications or settings.

In some examples, this disclosure describes a method of decoding a sequence of video data that includes a plurality of pictures. The method may comprise decoding a first syntax element that indicates whether a first decoder-side refinement tool is enabled or disabled for a first subset of video data within the sequence of video data, and determining whether the first decoder-side refinement tool is enabled or disabled for the first subset of video data based on a value of the first syntax element. In addition, the method may comprise decoding a second syntax element that indicates whether a second decoder-side refinement tool is enabled or disabled for the first subset of video data with the sequence of video data, and determining whether the second decoder-side refinement tool is enabled or disabled for the first subset of video data based on a value of the first syntax element. As examples, the first subset of video data may comprise a slice, a picture, a sub-picture, a frame, or a block of video data within the video sequence. Decoding the first subset of video data may comprise decoding the first subset of video data using the first decoder-side refinement tool in response to the first decoder-side refinement tool being enabled for the first subset, decoding the first subset of video data without using the first decoder-side refinement tool in response to the first decoder-side refinement tool being disabled for the first subset, decoding the first subset of video data using the second decoder-side refinement tool in response to the second decoder-side refinement tool being enabled for the first subset, and decoding the subset of video data without using the second decoder-side refinement tool in response to the second decoder-side refinement tool being disabled for the first subset.

In other examples, this disclosure describes a method of encoding a sequence of video data that includes a plurality of pictures. The method may comprise encoding a first instance of a first syntax element to identify whether a first decoder-side refinement tool is enabled or disabled for a first subset of video data within the sequence of video data, encoding a second instance of the first syntax element to identify whether the first decoder-side refinement tool is enabled or disabled for a second subset of video data within the sequence of video data, wherein the second subset is different than the first subset, encoding a first instance of a second syntax element to identify whether a second decoder-side refinement tool is enabled or disabled for a first subset of video data within the sequence of video data, and encoding a second instance of the second syntax element to identify whether the second decoder-side refinement tool is enabled or disabled for a second subset of video data within the sequence of video data.

In some examples, this disclosure describes a video decoding device comprising a memory configured to store a sequence of video data that includes a plurality of pictures, and processing circuitry configured to decode a first syntax element that indicates whether a first decoder-side refinement tool is enabled or disabled for a first subset of video data within the sequence of video data, determine whether the first decoder-side refinement tool is enabled or disabled for the first subset of video data based on a value of the first syntax element, decode a second syntax element that indicates whether a second decoder-side refinement tool is enabled or disabled for the first subset of video data with the sequence of video data, and determine whether the second decoder-side refinement tool is enabled or disabled for the first subset of video data based on a value of the first syntax element. The processing circuitry may be further configured to decode the first subset of video data using the first decoder-side refinement tool in response to the first decoder-side refinement tool being enabled for the first subset, decode the first subset of video data without using the first decoder-side refinement tool in response to the first decoder-side refinement tool being disabled for the first subset, decode the first subset of video data using the second decoder-side refinement tool in response to the second decoder-side refinement tool being enabled for the first subset, and decode the subset of video data without using the second decoder-side refinement tool in response to the second decoder-side refinement tool being disabled for the first subset.

In some examples, this disclosure describes a video encoding device comprising a memory configured to store a sequence of video data that includes a plurality of pictures, and processing circuitry configured to encode a first instance of a first syntax element to identify whether a first decoder-side refinement tool is enabled or disabled for a first subset of video data within the sequence of video data, encode a second instance of the first syntax element to identify whether the first decoder-side refinement tool is enabled or disabled for a second subset of video data within the sequence of video data, wherein the second subset is different than the first subset, encode a first instance of a second syntax element to identify whether a second decoder-side refinement tool is enabled or disabled for a first subset of video data within the sequence of video data, and encode a second instance of the second syntax element to identify whether the second decoder-side refinement tool is enabled or disabled for a second subset of video data within the sequence of video data.

In still other examples, this disclosure describes a computer-readable storage medium storing instructions that, when executed, cause one or more processors of a video device to perform the encoding or decoding methods of this disclosure.

The details of one or more examples are set forth in the accompanying drawings and the description below. Other features, objects, and advantages will be apparent from the description, drawings, and claims.

DETAILED DESCRIPTION

Figure 1:
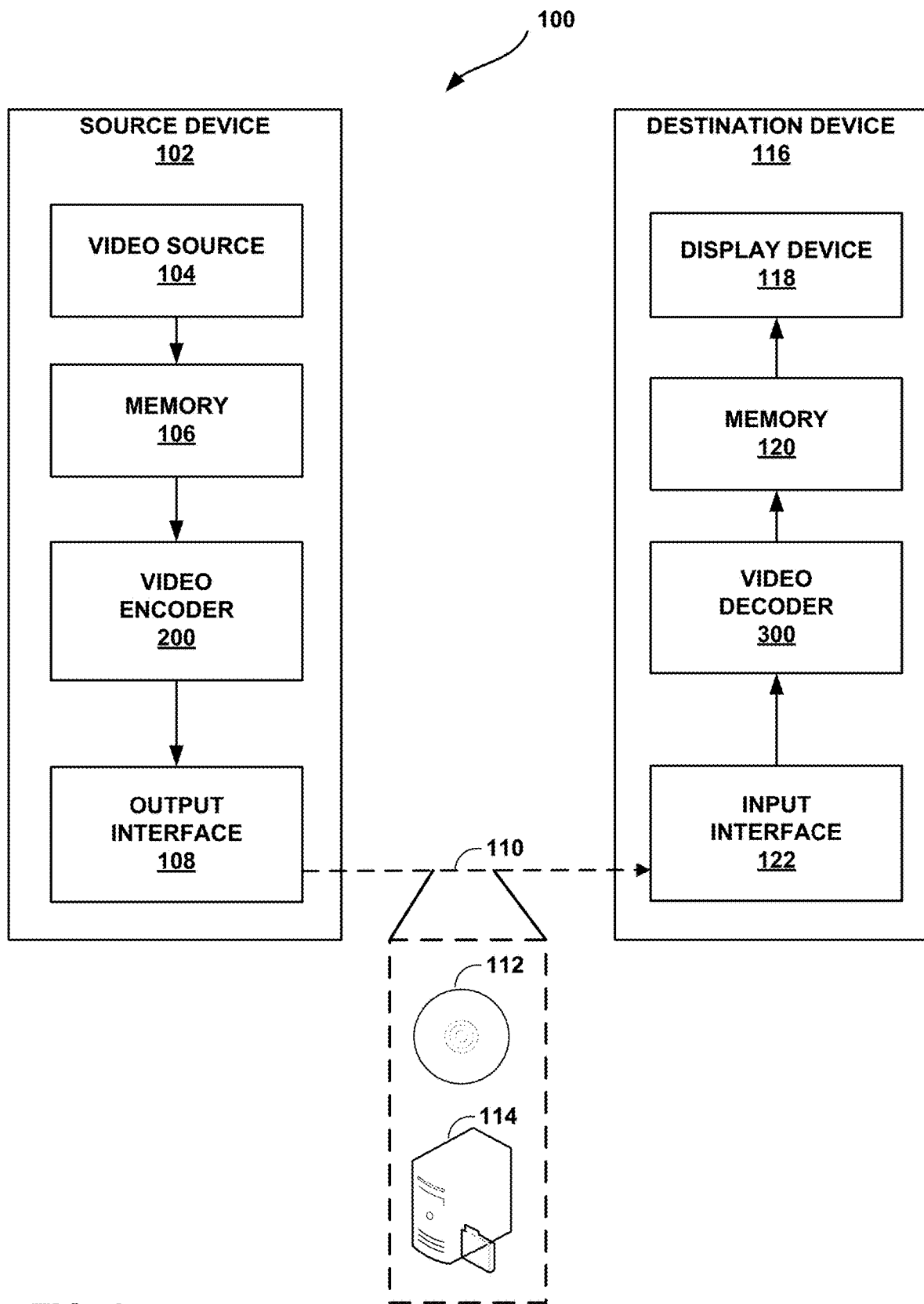
FIG. 1 is a block diagram illustrating an example video encoding and decoding system that may perform the techniques of this disclosure.

This disclosure describes techniques for enabling very precise on/off control of two or more different decoder-side refinement tools. With some video compression standards, such as the current Versatile Video Coding (VVC) standard under development, several decoder-side motion refinement tools have been adopted to improve the compression efficiency. However, while the decoder-side motion refinement tools can improve compression efficiency, they can also increase decoding complexity, which is undesirable for some situations. The techniques of this disclosure can provide more flexibility in the ability to enable or disable decoder-side refinement tools, which can thereby provide flexibility between competing goals of reducing decoding complexity and increasing compression efficiency in different video applications or settings.

One example decoder-side refinement tool is a bi-directional optical flow (BDOF) tool, and another example decoder-side refinement tool is decoder-side motion vector refinement (DMVR) tool. In general, this disclosure describes techniques for decoder-side motion refinement on/off control of these or other decoder-side refinement tools. In particular, the described techniques can allow for very precise on/off control of subsets of video data within a video sequence. For example, rather than merely allowing or enabling these tools for a video sequence, this disclosure describes techniques for enabling or disabling different decoder-side refinement tools for subsets (or portions) of a video sequence.

In some examples, separate on/off control of different decoder-side refinement tools can be enabled or disabled for different subsets or portions of a video sequence, e.g., for a slice of video data within the video sequence, a frame of video data within the video sequence, a picture of video data within the video sequence, a sub-picture of video data within the video sequence, a block of video data within the video sequence, or another portion (some but not all) of the video data of a video sequence. In this way, more flexibility is available between the competing goals of reducing decoding complexity and increasing compression efficiency in different video applications or settings. A subset of a video sequence, for example, may comprise at least a portion of a first picture among the plurality of pictures of the sequence of video data.

According to this disclosure, one or more decoder-side refinement tools can be enabled for improved compression efficiency, or alternatively, one or more decoder-side refinement tools can be disabled to promote decoder simplicity. The control can be more adaptive by allowing such control on subsets of video data (e.g., for only portions or parts of an entire video sequence). On/off control may be signaled via one or more syntax elements of a coded bitstream for frames of video data, pictures of video data, slices of video data, sub-pictures of video data, blocks of video data, or other subsets or sub-portions of a larger video sequence.

This disclosure will use the following acronyms:
Coding Unit: CU
Coding Tree Unit: CTU
Motion Vector: MV
Motion Vector Difference: MVD
Motion Vector Predictor: MVP FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for decoder-side motion refinement on/off control. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for decoder-side motion refinement on/off control. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v3 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs).

According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data. Indeed, this disclosure contemplates decoder-side refinement control signaling that occurs in parameter sets associated with a portion or a subset (e.g., some but not all) of a video sequence. Such signaling, for example, may apply to pictures, frames, slices, sub-pictures, video blocks, or another subset of video data within a larger sequence of video data. Thus, decoder-side refinement control signaling may be controlled such that a first subset of video data associated with a video sequence (e.g., a first picture, slice, frame, sub-picture, block, or other subset of video data) is decoded with different decoder-side refinement tools than a second subset of video data within the same video sequence (e.g., a different picture, slice, frame, block, sub-picture, or other subset of video data) that is different than the first subset of video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data. The on/off signaling of decoder-side refinement tools can ensure that the decoder is properly configured to apply any desired decoder-side refinements, and the control can be more refined than conventional control.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. In addition, the syntax elements may allow for precise (sub-sequence level) control of whether decoder side-refinement tools are on or off for different portions of the video sequence. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to code syntax elements indicating whether a decoder-side motion refinement mode is on or off for a subset of video data within a video sequence (e.g., a slice, picture, frame, sub-picture, block, or other subset), and video encoder 200 and video decoder 300 may be configured code blocks of video data subset based on the syntax element associated with that subset (e.g., slice, picture, frame, sub-picture, block, or other subset).

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116. According to this disclosure, different syntax elements can be used for signaling whether different decoder-side refinement tools are enabled, and the syntax elements may be signaled many times for a video sequence so as to allow the decoder-side refinement tools to be enabled or disabled for different subsets or portions of a video sequence (e.g., for different slices, pictures, frames, sub-pictures, or blocks of video data within a larger video sequence of video data).

Figure 2A:
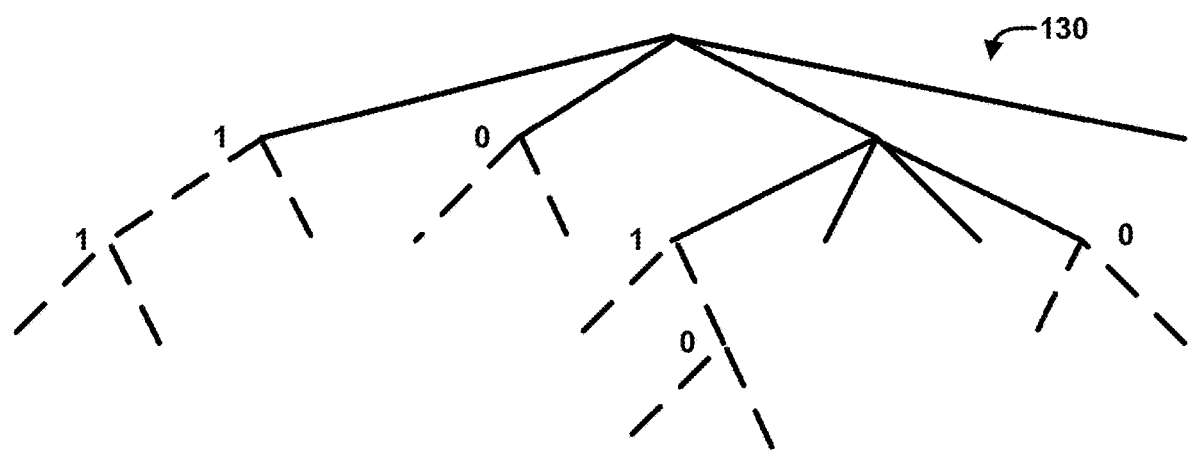
FIGS. 2A and 2B are conceptual diagrams illustrating an example quadtree binary tree (QTBT) structure, and a corresponding coding tree unit (CTU).
Figure 2B:
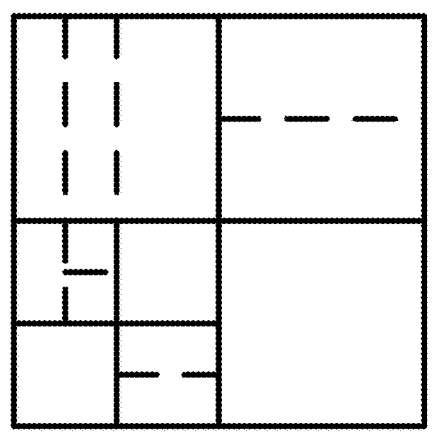

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
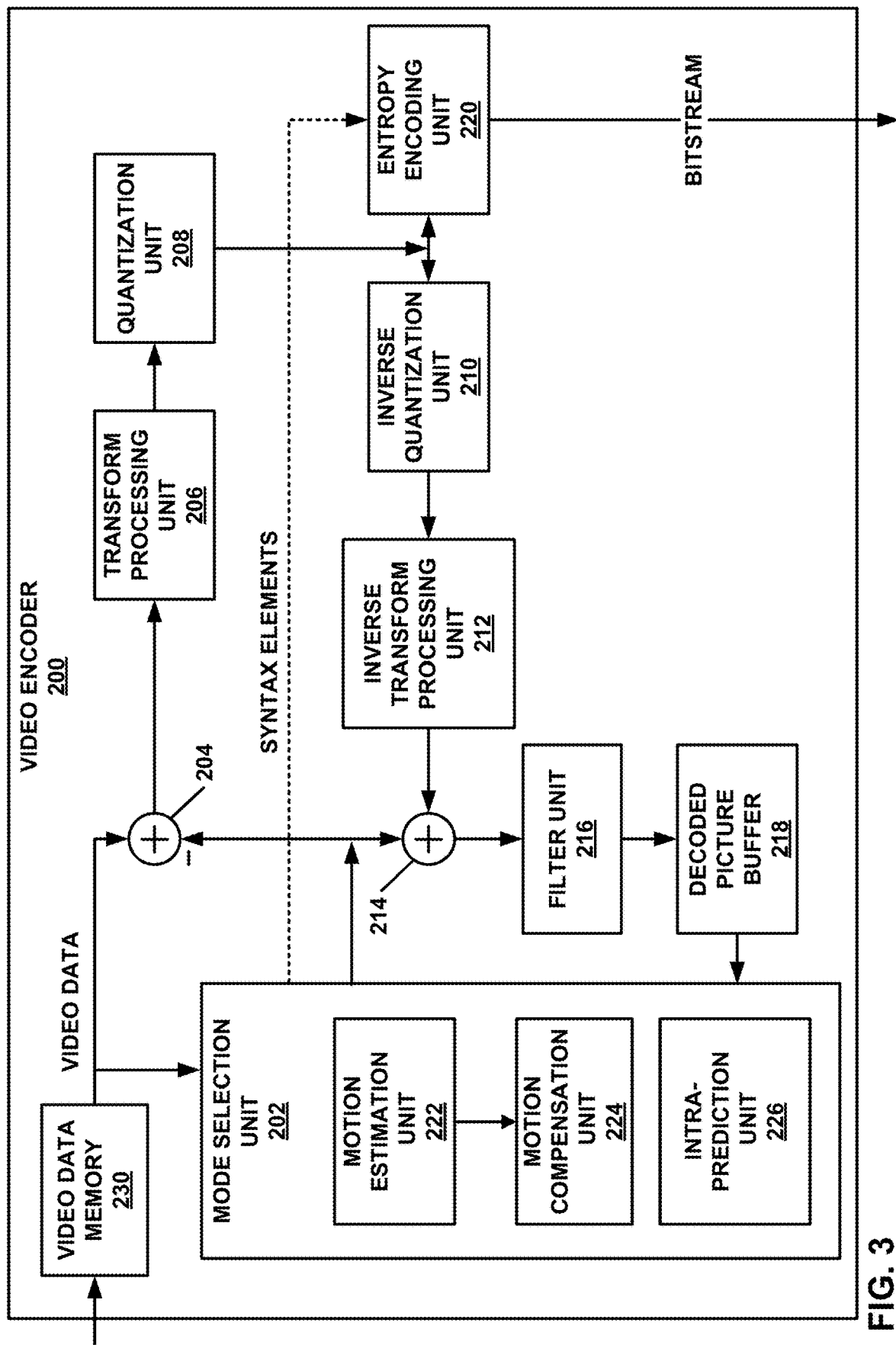
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to code syntax elements (e.g., at slice level, picture level, sub-picture level, frame level, or block level) indicating if a decoder-side motion refinement mode is on or off for subset of video data within a video sequence, and to code blocks of video data in subset of video data based on the syntax elements.

According to some examples, decoder-side refinement signaling (e.g., on/off control for subsets of a video sequence) may be performed by mode select unit 202, and possibly applied by motion estimation unit 222 and motion compensation unit 224 as part of a decoding loop in the encoding process. For example, the enablement or disablement of a DMVR tool may be signaled by mode selection unit 202 by outputting the value indicating on or off of DMVR to entropy encoding unit 220. Similarly, the enablement or disablement of a BDOF tool may be signaled by mode selection unit 202 by outputting the value indicating on or off of BDOF to entropy encoding unit 220. Other types of decoder-side refinements, however, which may be enabled or disabled as described herein, may be enabled by other units, such as intra-prediction unit 226 and/or filter unit 216.

In some examples, video encoder 200 may be configured to encode a sequence of video data that includes a plurality of pictures. In doing so, video encoder 200 (specifically motion compensation unit 224 and entropy encoding unit 220) may be configured to encode a first instance of a first syntax element to identify whether a first decoder-side refinement tool is enabled or disabled for a first subset of video data within the sequence of video data, and encode a second instance of the first syntax element to identify whether the first decoder-side refinement tool is enabled or disabled for a second subset of video data within the sequence of video data, wherein the second subset is different than the first subset. In addition, video encoder 200 (specifically motion compensation unit 224 and entropy encoding unit 220) may be further configured to encode a first instance of a second syntax element to identify whether a second decoder-side refinement tool is enabled or disabled for a first subset of video data within the sequence of video data, and encode a second instance of the second syntax element to identify whether the second decoder-side refinement tool is enabled or disabled for a second subset of video data within the sequence of video data. In this way, on/off control of two different decoder-side refinement tools can be enabled or disabled in a coded bitstream for different subsets of a coded video sequence. Video data memory 230 may comprise a memory configured to store a sequence of video data that includes a plurality of pictures, and motion compensation unit 224 and entropy encoding unit 220 may comprise processing circuitry configured to perform the encoding and determinations associated with decoder-side refinement tools.

Figure 4:
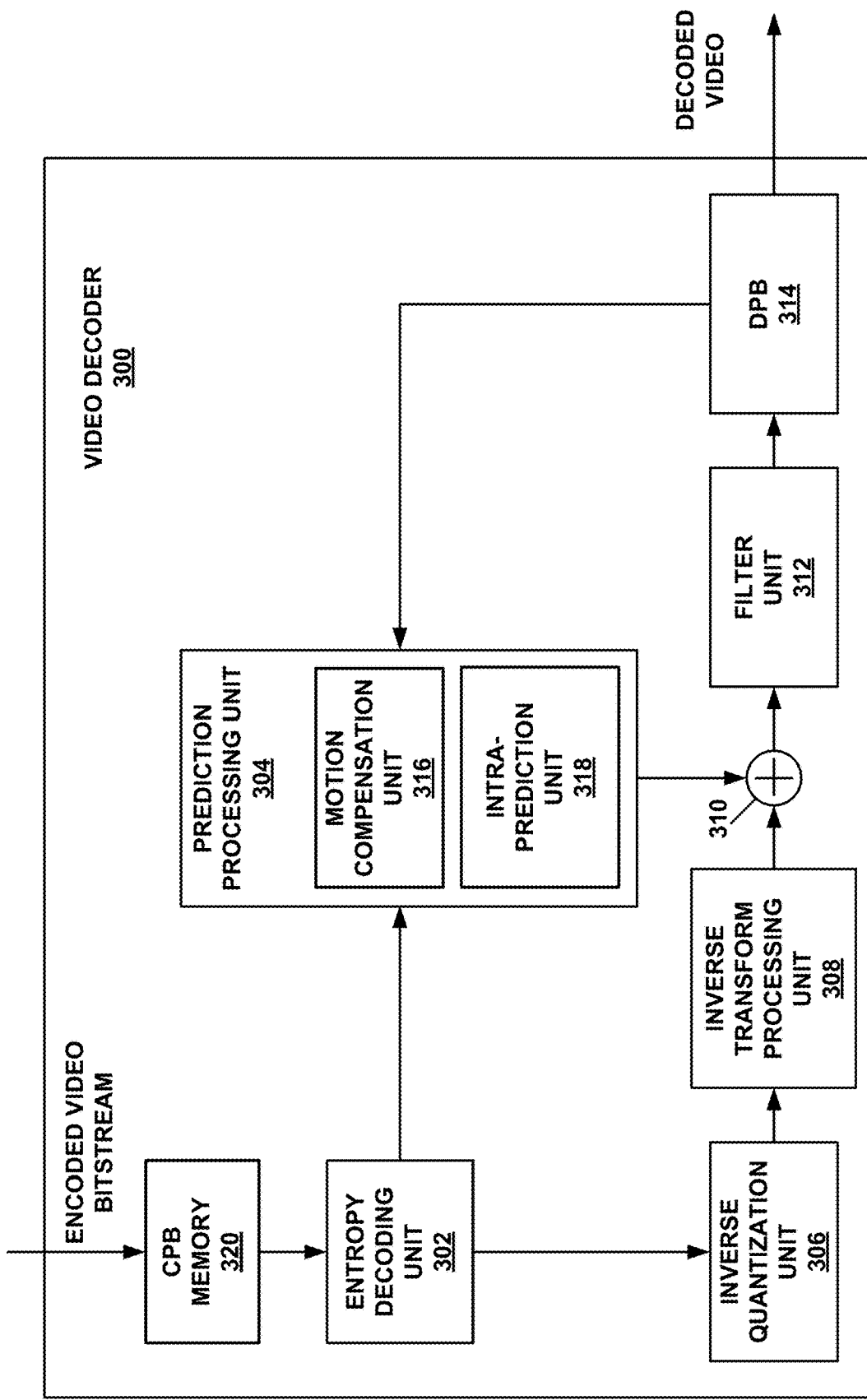
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300. In some examples, decoder-side refinement (when enabled) is performed by units within video decoder 300, such as prediction processing unit 304, motion compensation unit 316, intra-prediction unit 318 and/or filter unit 312. For example, a DMVR, when enabled, may be performed by motion compensation unit 316 and BDOF, when enabled, may be performed by motion compensation unit. In other examples, other types of decoder-side refinements, which may be enabled or disabled as described herein, may be performed by motion compensation unit 316 or by other units, such as intra-prediction unit 318 and/or filter unit 312.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to code syntax elements (e.g., at slice level, picture level, sub-picture level, frame level, or block level) indicating if a decoder-side motion refinement mode is on or off for subset of video data within a video sequence, and to code blocks of video data in subset of video data based on the syntax elements.

For example, video decoder 300 (specifically entropy decoding unit 302 and motion compensation unit 316) may be configured to decode a first syntax element that indicates whether a first decoder-side refinement tool is enabled or disabled for a first subset of video data within the sequence of video data, determine whether the first decoder-side refinement tool is enabled or disabled for the first subset of video data based on a value of the first syntax element, decode a second syntax element that indicates whether a second decoder-side refinement tool is enabled or disabled for the first subset of video data with the sequence of video data, and determine whether the second decoder-side refinement tool is enabled or disabled for the first subset of video data based on a value of the first syntax element. Video decoder 300 (specifically entropy decoding unit 302 and motion compensation unit 316) may decode the first subset of video data using the first decoder-side refinement tool in response to the first decoder-side refinement tool being enabled for the first subset, decode the first subset of video data without using the first decoder-side refinement tool in response to the first decoder-side refinement tool being disabled for the first subset, decode the first subset of video data using the second decoder-side refinement tool in response to the second decoder-side refinement tool being enabled for the first subset, and decode the first subset of video data without using the second decoder-side refinement tool in response to the second decoder-side refinement tool being disabled for the first subset. CPB memory 320 may comprise a memory configured to store a sequence of video data that includes a plurality of pictures, and entropy decoding unit 302 and motion compensation unit 316 may comprise processing circuitry configured to perform the decoding and determinations associated with decoder-side refinement tools.

Bi-Directional Optical Flow (BDOF)

The bi-directional optical flow (BDOF) mode, previously is also referred to as BIO, is a tool that may be used to refine the bi-prediction signal of a coding unit (CU) at the 4×4 sub-block level. As its name indicates, the BDOF mode is based on the optical flow concept, which assumes that the motion of an object is smooth. For each 4×4 sub-block, video encoder 200 and video decoder 300 may calculate a motion refinement ($v_x$, $v_y$) by minimizing the difference between the L0 and L1 prediction samples. Video encoder 200 and video decoder 300 may then use the motion refinement to adjust the bi-predicted sample values in the 4×4 sub-block.

The following steps may be applied in the BDOF process. First, video encoder 200 and video decoder 300 may compute the horizontal and vertical gradients, $$\frac{\partial I^{(k)}}{\partial x}(i, j) \text{ and } \frac{\partial I^{(k)}}{\partial y}(i, j),$$

k=0, 1, of the two prediction signals by directly calculating the difference between two neighboring samples, i.e., $$\frac{\partial I^{(k)}}{\partial x}(i, j) = (I^{(k)}(i+1, j) - I^{(k)}(i-1, j)) \gg shift1$$

$$\frac{\partial I^{(k)}}{\partial y}(i, j) = (I^{(k)}(i, j+1) - I^{(k)}(i, j-1)) \gg shift1$$

where $I^{(k)}(i, j)$ are the sample value at coordinate (i, j) of the prediction signal in list k, k=0, 1.

Then, video encoder 200 and video decoder 300 may calculate the auto- and cross-correlation of the gradients, $S_1$, $S_2$, $S_3$, $S_5$ and $S_6$, as:

$$S_1 = \sum_{(i,j)\in\Omega} \psi_x(i, j)\cdot\psi_x(i, j), S_3 = \sum_{(i,j)\in\Omega} \theta(i, j)\cdot\psi_x(i, j)$$

$$S_2 = \sum_{(i,j)\in\Omega} \psi_x(i, j)\cdot\psi_y(i, j)$$

$$S_5 = \sum_{(i,j)\in\Omega} \psi_y(i, j)\cdot\psi_y(i, j) S_6 = \sum_{(i,j)\in\Omega} \theta(i, j)\cdot\psi_y(i, j),$$

-continued where $$\psi_x(i, j) = \left(\frac{\partial I^{(1)}}{\partial x}(i, j) + \frac{\partial I^{(0)}}{\partial x}(i, j)\right) \gg n_a$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = (I^{(1)}(i, j) \gg n_b) - (I^{(0)}(i, j) \gg n_b),$$

and where $\Omega$ is a 6×6 window around the 4×4 sub-block.

Video encoder 200 and video decoder 300 may the derive the motion refinement ($v_x$, $v_y$) using the cross- and auto-correlation terms using the following equation:

$$v_x = S_1 > 0 ? clip3(-th'_{BIO}, th'_{BIO}, -((S_3 \cdot 2^{n_b-n_a}) \gg \lfloor \log_2 S_1 \rfloor)) : 0$$

$$v_y = S_5 > 0 ? clip3(-th'_{BIO}, th'_{BIO}, -((S_6 \cdot 2^{n_b-n_a} - ((v_x s_{2,m}) \ll n_{s_2} + v_x s_{2,s})/2) \gg \lfloor \log_2 S_5 \rfloor)) : 0$$

where $\lfloor \cdot \rfloor$ is the floor function.

Based on the motion refinement and the gradients, video encoder 200 and video decoder 300 may calculate the following adjustment for each sample in the 4×4 sub-block:

$$b(x, y) = rnd\left(\left(v_x\left(\frac{\partial I^{(1)}(x, y)}{\partial x} - \frac{\partial I^{(0)}(x, y)}{\partial x}\right)\right)/2\right) + rnd\left(\left(v_y\left(\frac{\partial I^{(1)}(x, y)}{\partial y} - \frac{\partial I^{(0)}(x, y)}{\partial y}\right)\right)/2\right)$$

Finally, video encoder 200 and video decoder 300 may calculate the BDOF samples of the CU by adjusting the bi-prediction samples as follows:

$$pred_{BDOF}(x,y) = (I^{(0)}(x,y) + I^{(1)}(x,y) + b(x,y) + o_{offset}) \gg shift$$

These values are selected such that the multipliers in the BDOF process do not exceed 15-bits, and the maximum bit-width of the intermediate parameters in the BDOF process is kept within 32-bits.

Figure 5:
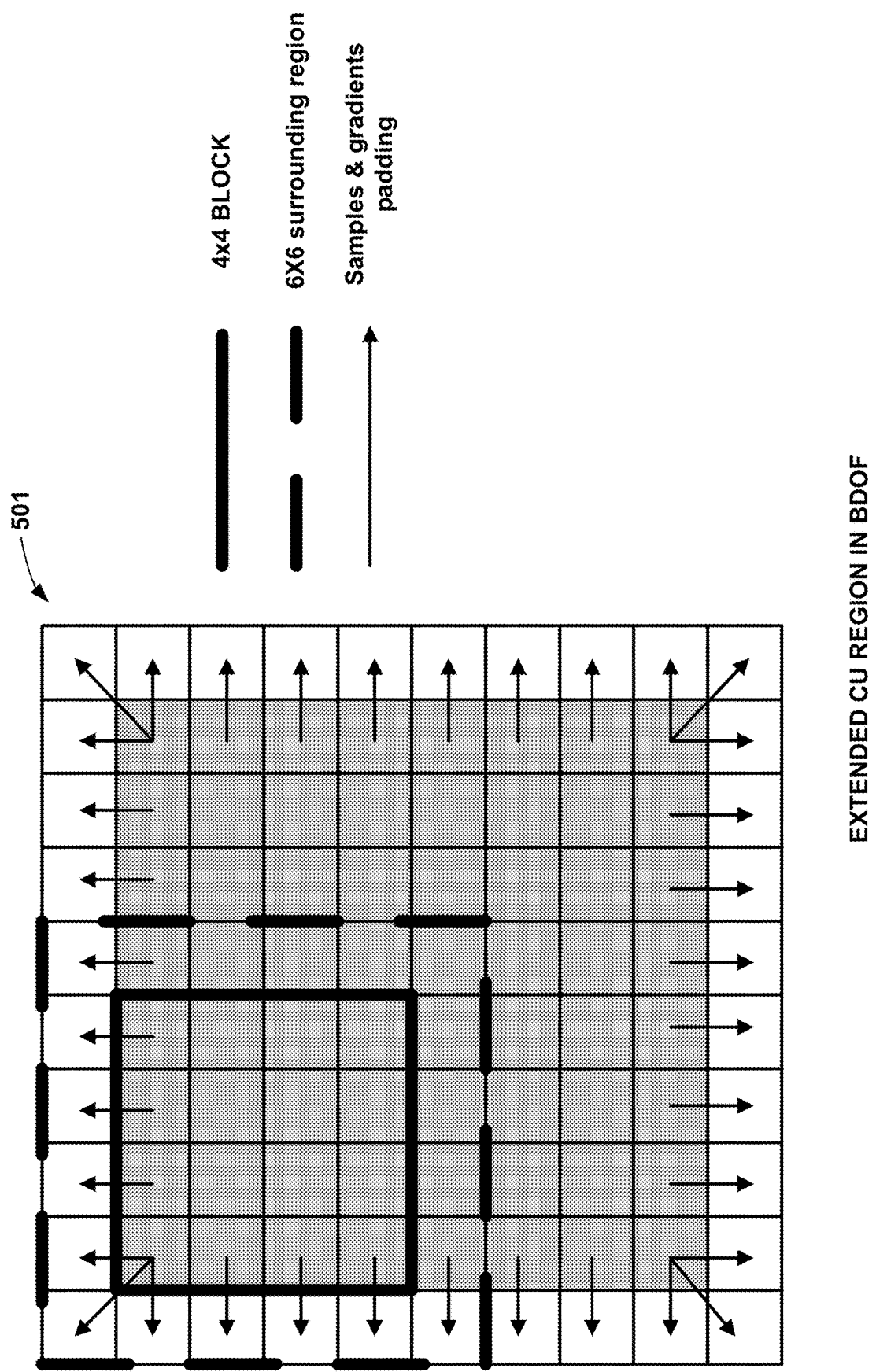
FIG. 5 is a conceptual diagram illustrating an extended coding unit region used in bi-directional optical flow.

In order to derive the gradient values, video encoder 200 and video decoder 300 may generate some prediction samples $I^{(k)}(i, j)$ in list k (k=0, 1) outside of the current CU boundaries. FIG. 5 is a conceptual diagram illustrating an extended coding unit region 501 used in bi-directional optical flow. As depicted in FIG. 5, the BDOF in VVC Test Model 4.0 (VTM4) uses one extended row/column around the boundary of a CU. In order to control the computational complexity of generating the out-of-boundary prediction samples, video encoder 200 and video decoder 300 may generate prediction samples in the extended area (white positions) by taking the reference samples at the nearby integer positions (using floor( ) operation on the coordinates) directly without interpolation, and the normal 8-tap motion compensation interpolation filter is used to generate prediction samples within the CU (gray positions). In some examples, video encoder 200 and video decoder 300 may only use these extended sample values in gradient calculation. For the remaining steps in the BDOF process, if any sample and gradient values outside of the CU boundaries are needed, video encoder 200 and video decoder 300 may pad (e.g., repeated) the sample and gradient values from their nearest neighbors.

In one example of the VTM, video encoder 200 and video decoder 300 may be configured to apply BDOF for the CUs which are coded with following conditions:

Bi-prediction MV

Bi-prediction is equal weights for two directions

One reference picture is in the past and another reference picture is in the future with respect to the current picture CU has more 64 luma samples and CU height is more than or equal to 8 luma samples Decoder-Side Motion Vector Refinement (DMVR)

Figure 6:
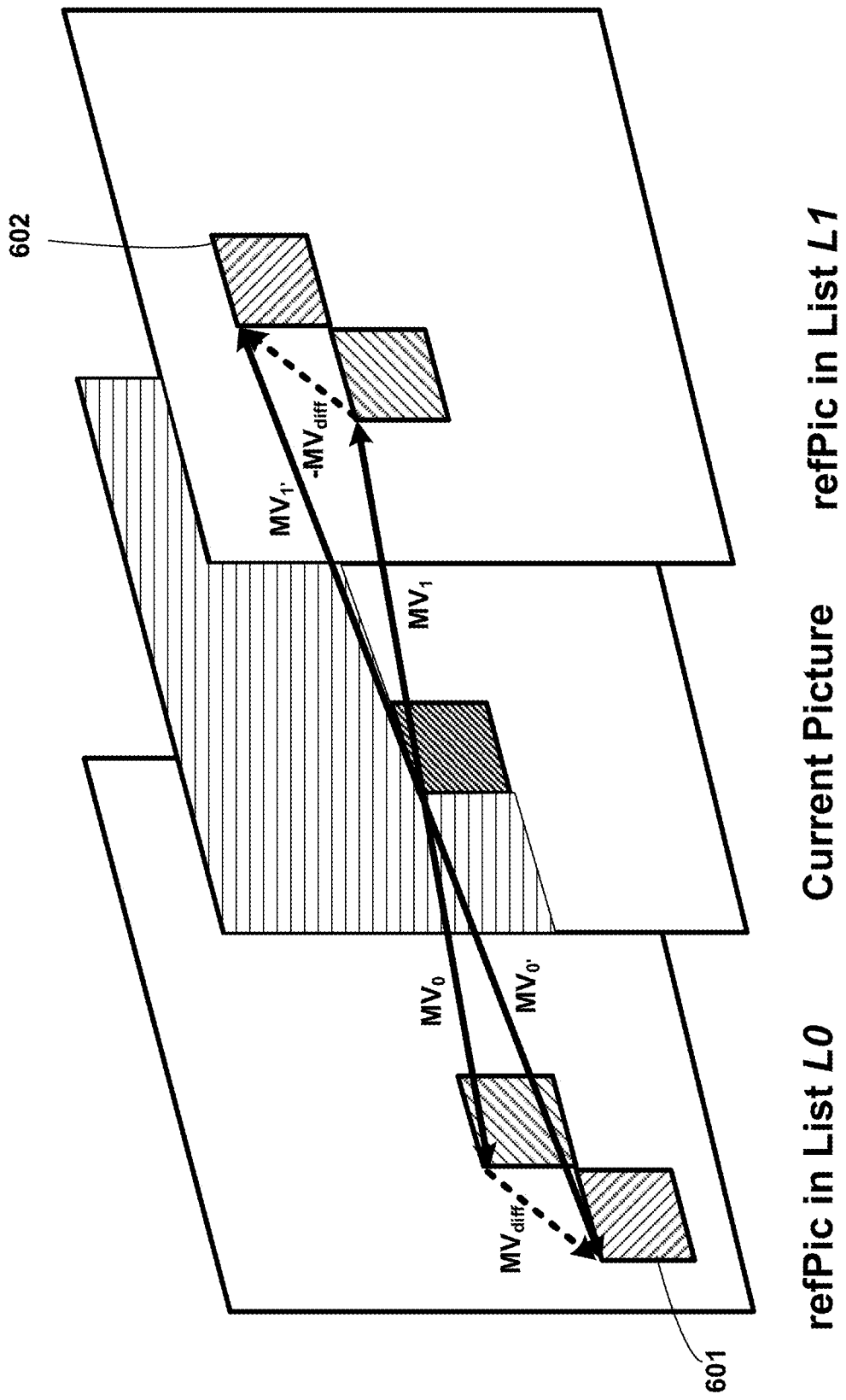
FIG. 6 is a conceptual diagram illustrating an example of decoder-side motion vector refinement.

In order to increase the accuracy of the MVs of the merge mode, video encoder 200 and video decoder 300 may be configured to apply a bilateral-matching based decoder-side motion vector refinement. In some examples, video encoder 200 may apply the decoder-side motion vector refinement techniques in a reconstruction loop. In bi-prediction operation, video decoder 300 may be configured to search a refined MV around the initial MVs in the reference picture list L0 and reference picture list L1. Video decoder 300 may use a block matching method to calculate the distortion between the two candidate blocks in the reference picture list L0 and list L1. FIG. 6 is a conceptual diagram illustrating an example of decoder-side motion vector refinement.

As illustrated in FIG. 6, video decoder 300 may calculate the sum of absolute difference (SAD) between the blocks labeled 601 and 602 based on each MV candidate around the initial MV. The MV candidate with the lowest SAD becomes the refined MV and is used by video decoder 300 to generate the bi-predicted signal.

In one example of the VTM, the DMVR is applied for the CUs which are coded with following conditions:

CU level merge mode with bi-prediction MV

Bi-prediction is equal weights for two directions

One reference picture is in the past and another reference picture is in the future with respect to the current picture The distances (i.e. POC difference) from both reference pictures to the current picture are same CU has more 64 luma samples and CU height is more than 8 luma samples Merge Mode with Motion Vector Difference (MMVD)

In addition to merge mode, where the implicitly derived motion information is directly used for prediction samples generation of the current CU, the merge mode with motion vector differences (MMVD) is introduced in VVC. Video encoder 200 may be configured to signal an MMVD flag after sending a skip flag and merge flag to specify whether MMVD mode is used for a CU.

In MMVD, after a merge candidate is selected, video encoder 200 and video decoder 300 may further refine the merge candidate using the signalled MVDs information. The further information includes a merge candidate flag, an index to specify motion magnitude, and an index for indication of motion direction. In MMVD mode, video encoder 200 and video decoder 300 may select one for the first two candidates in the merge list to be used as the MV basis. Video encoder 200 signals the merge candidate flag to specify which one is used. Video decoder 300 decodes the flag to determine the merge candidate to use.

Figure 7:
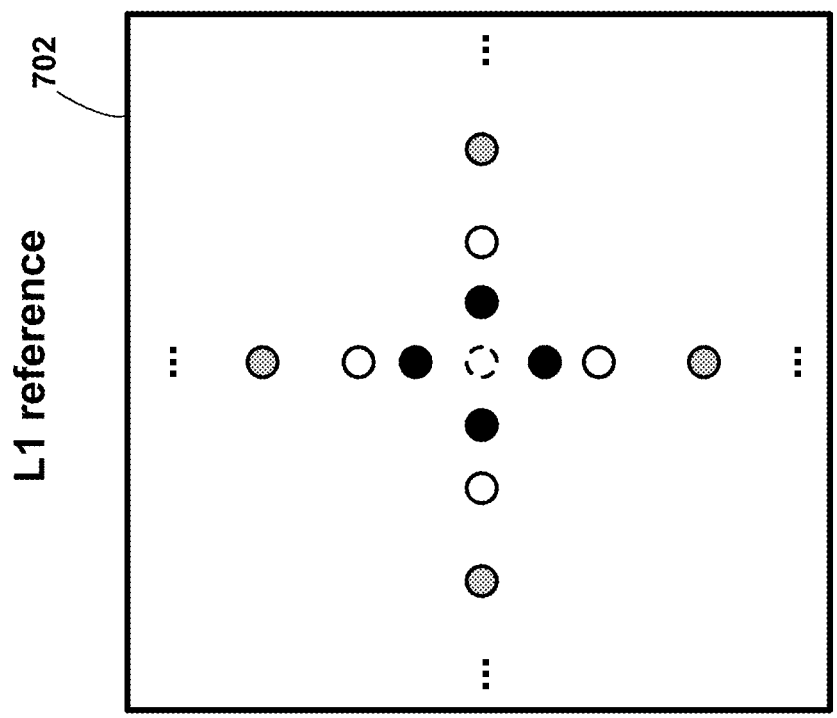
FIG. 7 is a conceptual diagram illustrating an example merge mode with motion vector difference search point.
Figure 7:
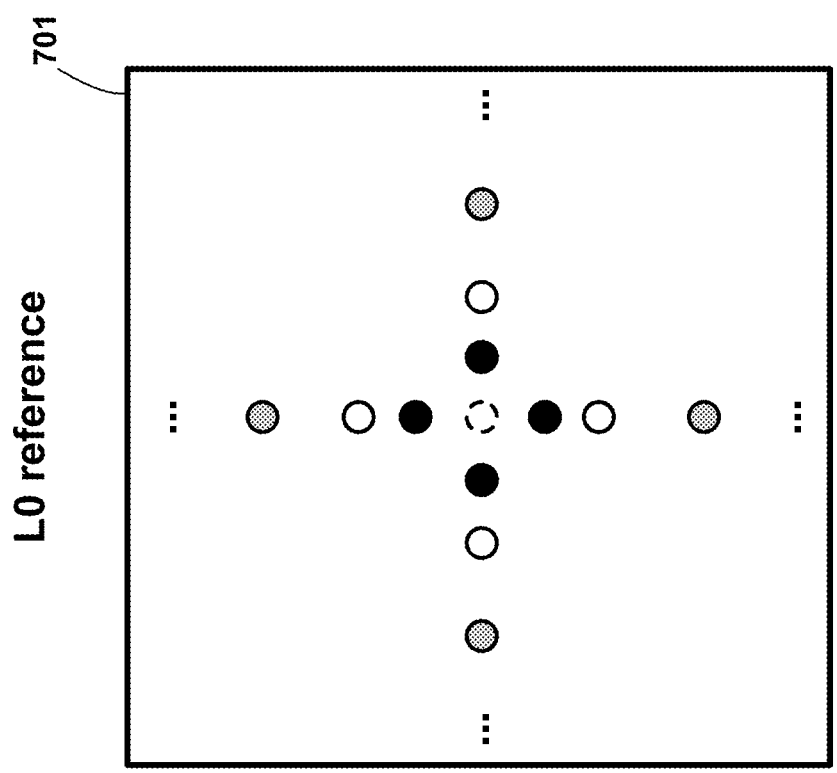

The distance index (IDX) specifies motion magnitude information and indicates the pre-defined offset from the starting point. FIG. 7 is a conceptual diagram illustrating an example merge mode with motion vector difference search point. The search point may be defined at the center point shown within L0 reference 701 and/or at the center point of shown within L1 reference 702. As shown in FIG. 7, an offset is added to either horizontal component or vertical component of starting MV. The relation of distance index and pre-defined offset is specified in Table 1-1.

TABLE 1-1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

The direction index (IDX) represents the direction of the MVD relative to the starting point. The direction index can represent of the four directions as shown in Table 1-2. The meaning of the MVD sign may vary according to the information of the starting MVs. When the starting MV(s) is a uni-prediction MV or bi-prediction MVs with both lists pointing to the same side of the current picture (i.e., POCs of two references are both larger than the POC of the current picture, or are both smaller than the POC of the current picture), the sign in Table 1-2 specifies the sign of the MV offset added to the starting MV. When the starting MVs are bi-prediction MVs with the two MVs point to the different sides of the current picture (i.e., the POC of one reference is larger than the POC of the current picture, and the POC of the other reference is smaller than the POC of the current picture), the sign in Table 1-2 specifies the sign of MV offset added to the list0 MV component of starting MV and the sign for the list1 MV has opposite value.

TABLE 1-2

Sign of MV offset specified by direction index

| | Direction IDX | | | |
|---|---|---|---|---|
| | 00 | 01 | 10 | 11 |
| x-axis | + | − | N/A | N/A |
| y-axis | N/A | N/A | + | − |

The decoder-side motion refinement tools described above can improve the compression efficiency. However, use of the decoder-side motion refinement tools also increases the encoding/decoding complexity. In this disclosure, techniques for on/off control of decoder-side motion refinement tools are disclosed to provide options for implementers to select the best trade-offs between complexity and compression efficiency in different applications.

This disclosure generally describes on/off control that applies to a subset of video data within a video sequence. Thus, according to this disclosure, control of different decoder-side refinement tools can be enabled or disabled for different subsets or portions of a video sequence, e.g., for a slice of video data, a frame of video data, a picture of video data, a sub-picture of video data, or block of video data within the video sequence. In this way, more flexibility is available between the competing goals of reducing decoding complexity and increasing compression efficiency in different video applications or settings. A subset of a video sequence, for example, may comprise at least a portion of a first picture among the plurality of pictures of the sequence of video data.

A slice may refer to a portion or subset of video data. A slice may comprise an entire picture of a video sequence or a portion thereof. A video sequence may comprise a plurality of pictures. A subset of a video sequence, for example, may comprise at least a portion of a first picture among the plurality of pictures of the sequence of video data, e.g., an entire picture or frame, some but not all of the pictures of a sequence, a portion of a picture of a sequence, a slice (which my comprise some or all of a picture), a set of blocks, or an individual video block). Control may be provided at any of these different levels, according to this disclosure, as long as the control can allow for different portions of a video sequence to apply different decoder-side refinements.

Slice Level Control

In one example of the disclosure, video encoder 200 and video decoder 300 may be configured to code a slice level on/off control. That is, video encoder 200 and video decoder 300 may be configured to apply (i.e., turn on) or not apply (i.e., turn off) one or more decoder-side motion refinement techniques (e.g., DMVR, BDOF, etc.) on a slice level. Similar techniques to slice level control may apply for other sub-portions of a sequence.

In one example, video encoder 200 and video decoder 300 may code a first syntax element (e.g., a flag) at a slice header to indicate the on/off status of DMVR in the slice, and video encoder 200 and video decoder 300 may code a second syntax element (e.g., a flag) at the slice header to indicate the on/off status of BDOF in the slice, or vice versa.

In another example, video encoder 200 and video decoder 300 may code one syntax element (e.g., a flag) at a slice header to indicate the on/off status of both DMVR and BDOF in the slice.

In still another example, video encoder 200 and video decoder 300 may code only one syntax element (e.g., a flag) at a slice header to indicate the on/off status of DMVR in the slice. The on/off control of BDOF at the slice level is not available. That is, BDOF is not turned on/off at the slice level in this example.

In still another example, video encoder 200 and video decoder 300 may code only one syntax element (e.g., a flag) at a slice header to indicate the on/off status of BDOF in the slice. The on/off control of DMVR at the slice level is not available. That is, DMVR is not turned on/off at the slice level in this example. A slice may refer to an entire picture or a subset or portion of a picture.

Block Level Control

In a further example, video encoder 200 and video decoder 300 may code a syntax element at the block level for finer control. Several different methods may be used, as will be outlined below.

Block Level On/Off Flag

In one example, video encoder 200 and video decoder 300 may code a flag for a merge mode CU (i.e., a CU coded using merge mode) to indicate the on/off status of DMVR.

In one variation of the above technique, video encoder 200 and video decoder 300 may code the flag for a merge mode CU to indicate the on/off status of both DMVR and BDOF.

In another variation of the above techniques, video encoder 200 and video decoder 300 may code the flag to indicate the on/off status of DMVR (or BDOF) only if the merge candidate index is within some certain range. In one example, the range can be from 0 to N, wherein N can be 1, 2, 3, 4 et al. In another example, the range can be from N to the maximum allowed index, wherein N can be 1, 2, 3, 4 et al.

In another example, the DMVR on/off flag (also called an enable flag) and the BDOF on/off (enable) flag may be part of the motion information and are borrowed (e.g., reused) from the neighbor blocks as motion vector candidates. When artificial motion vector candidates are derived, video encoder 200 and video decoder 300 may set those flags to 0 in on example.

In other examples, rather than block level or slice level control, control may be provided for other defined subsets of video data within a larger video sequence, such as for a set of pictures (but only a portion of a video sequence), for individual pictures, for a frame of video data, for sub-pictures or portions of pictures, for a slice, for a block, or for another subset of video data within the larger video sequence.

Zero MVD for MMVD Mode

In another example, video encoder 200 and video decoder 300 may implement the block level on/off control via allowing a zero MVD for MMVD mode. Currently DMVR is not applied if the block is coded with MMVD mode. Therefore, if the MVD for MMVD mode is zero, then it will be equivalent to normal merge mode without DMVR. The same idea may be applied to the BDOF case. That is, BDOF is not used with a zero MVD in MMVD mode.

When zero MVD for MMVD mode is applied, video encoder 200 and video decoder 300 may modify the relation of distance index and pre-defined offset such that the first index indicates the zero offset and the other offset values' indices are added by one, accordingly. An example of the modified table is shown in Table 2-1. Note that is not necessary to change the signaling of the distance index. However, if the zero MVD is applied, and the signaled distance index is 0, then video encoder 200 and video decoder 300 may not need to code the direction index since a zero MVD does not have a direction.

TABLE 2-1

The relation of distance index and pre-defined offset when zero MVD applies

| Distance IDX | 0 | 1 | 2 | 3 | 4 | 5 | 6 | 7 |
|---|---|---|---|---|---|---|---|---|
| Offset (in unit of luma sample) | 0 | 1/4 | 1/2 | 1 | 2 | 4 | 8 | 16 |

Adaptive Zero MVD for MMVD Mode

In another example of the disclosure, video encoder 200 and video decoder 300 may adaptively apply the zero MVD on MMVD mode according to block size and/or slice type.

For P or a low delay coding slice, wherein DMVR cannot be applied, video encoder 200 and video decoder 300 may not apply zero MVD to MMVD mode. Similarly, DMVR is not applied to a block if size of the block does not meet a size constraint. In this example, video encoder 200 and video decoder 300 may not apply zero MVD to MMVD mode for the block.

The same techniques described above may be applied for BDOF mode.

BDOF

In some examples, the zero MVD can also be used to control BDOF. For example, if zero MVD is applied, video encoder 200 and video decoder 300 may not perform BDOF.

Redundancy Removal

In another example of the disclosure, video encoder 200 and video decoder 300 may apply the zero MVD on top of the selected base merge candidate. Even if the current slice is a B slice, and the current block satisfies the size constraint, the base merge candidate might not satisfy all the DMVR conditions. Therefore, DMVR is not guaranteed for the corresponding merge candidate. If zero MVD is applied to the base merge candidate, it could be identical to the merge candidate in regular merge mode. It is proposed to remove those redundant MMVD candidates by modifying the redundant MMVD candidates. For example, video encoder 200 and video decoder 300 may be configured to change prediction directions, reference picture/indices, and motion vectors.

The redundancy may also exist in the method described above with reference to the block level on/off flag. For example, when the CU level flag is on, the flag indicates that DMVR and/or BDOF may be applied to the current CU. However, some merge candidates may not satisfy all of the DMVR/BDOF conditions. Therefore, if that candidate is chosen, the CU level flag, whether on or off, will end up with identical results.

Accordingly, in additional examples of redundancy removal are described below. The techniques below can be applied with any combination of the block level on/off flag techniques described above, the zero MVD for MMVD mode techniques described above, or with any other block level DMVR/BDOF on/off control techniques.

Convert Uni-Prediction to Bi-Prediction

In another example of the disclosure, if the selected base merge candidate is uni-predicted, video encoder 200 and video decoder 300 may convert the selected base merge candidate to bi-prediction for redundancy removal.

In one example, video encoder 200 and video decoder 300 may perform the conversion by mirroring the uni-directional motion. In one example, if the uni-directional motion vector is MV0, the reference list is L0, and reference index is refIdx0, then the mirrored motion vector in the other list is MV1=−MV0, the reference list is L1, and the reference index is refIdx1=refIdx0. In another example, the mirrored reference index is always 0, and the mirrored motion vector is scaled according the POC distance between current picture and the reference pictures indicated by refIdx0 in L0 and reference index 0 in L1.

Adding New Distance Offset Value

In some examples, if the selected base merge candidate is bi-predicted, but does not meet the DMVR conditions, video encoder 200 and video decoder 300 may interpret the distance index 0 as a new distance offset value that does not exist in the MMVD offset table. F or example, ⅛, 1/16 et al.

Instead of converting uni-prediction to bi-prediction, the method of adding new offset values may also be applied to base merge candidate that is uni-prediction.

Convert Bi-Prediction to Uni-Prediction

In another example of removing redundancy for bi-prediction base merge candidates, video encoder 200 and video decoder 300 may convert the bi-prediction base merge candidate to uni-prediction. For example, the L0/L1 motion is discarded if selected base merge candidate is bi-prediction but does not meet the DMVR conditions.

Convert Between Non-Equal Weight Bi-Prediction and Equal Weight Bi-Prediction

In some cases, video encoder 200 and video decoder 300 may not perform DMVR on bi-prediction merge candidates if the weighting parameters for two directions are not equal. If non-equal weight bi-prediction is allowed in MMVD and zero MVD is applied, then video encoder 200 and video decoder 300 may convert the non-equal weight bi-prediction base merge candidate to equal weight bi-prediction base merge candidate, and video encoder 200 and video decoder 300 may convert the equal weight bi-prediction base merge candidate to non-equal weight bi-prediction base merge candidate.

In some cases, sequence level control may determine whether one or more decoder-side refinement tools are available for a large video sequence, and lower level control (e.g. for a subset of the sequence) may allow the decoder-side refinement tools to be controlled on or off for the different subsets within the video sequence.

Figure 8:
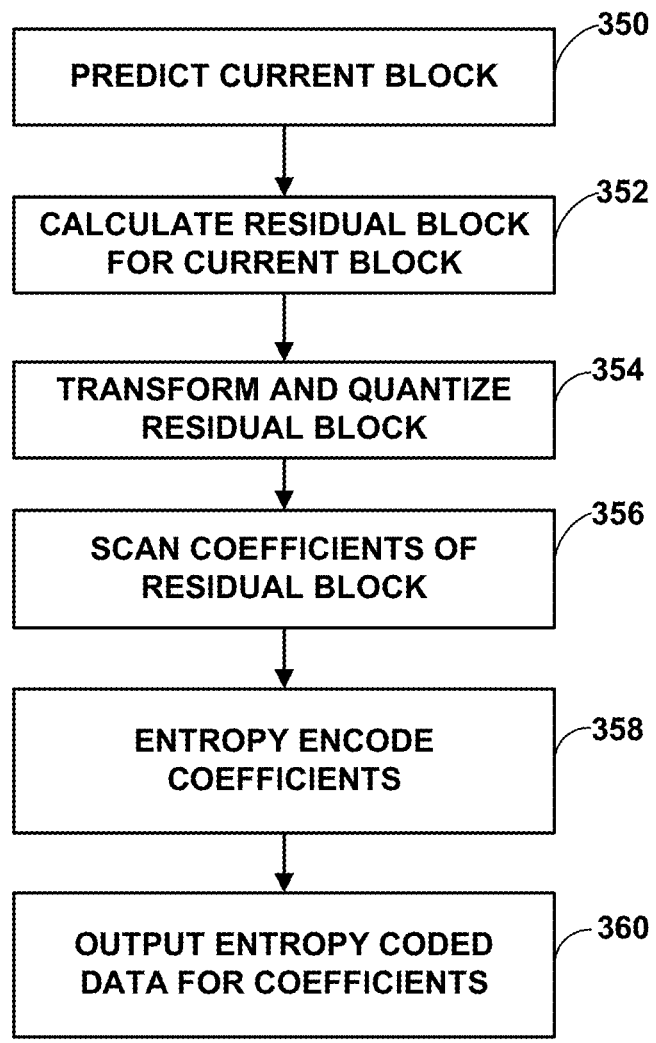
FIG. 8 is a flowchart illustrating an example encoding method of this disclosure.

FIG. 8 is a flowchart illustrating an example method for encoding a current block. The current block may comprise a current CU. Although described with respect to video encoder 200 (FIGS. 1 and 3), it should be understood that other devices may be configured to perform a method similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

In some examples consistent with FIG. 8, the encoding process (such as the step of predicting the current block (350)) may include steps for enabling or disabling decoder-side refinements. Therefore, the encoding process may include steps for encoding syntax elements as described herein for enabling or disabling such decoder-side refinement tools for different subsets or portions of a larger video sequence.

Figure 9:
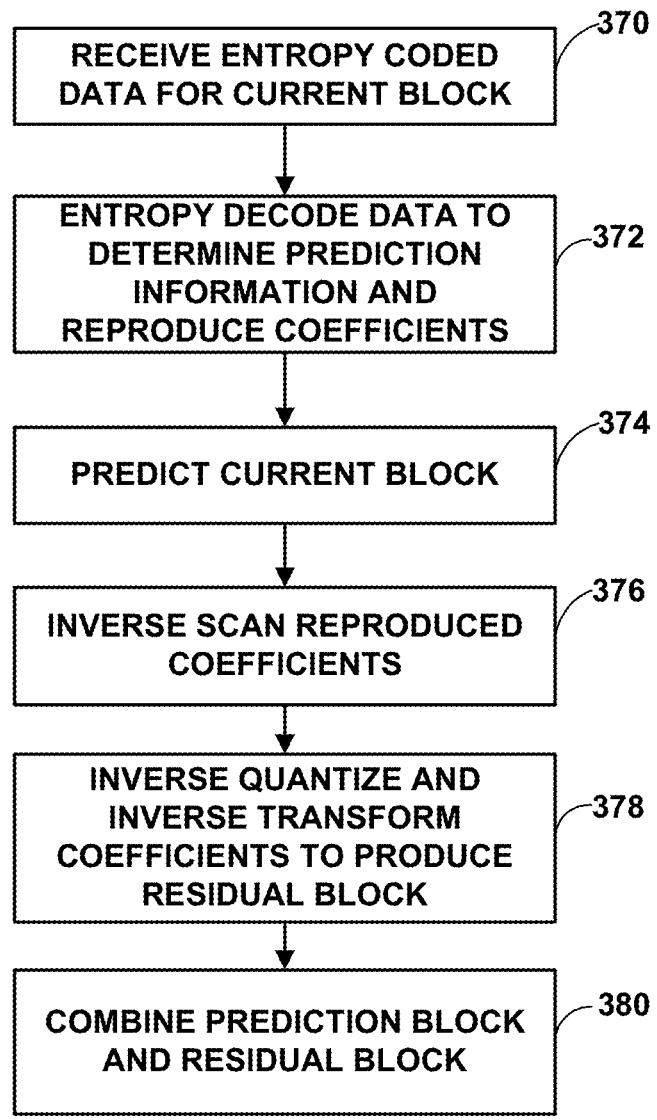
FIG. 9 is a flowchart illustrating an example decoding method of this disclosure.

FIG. 9 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 9.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 10:
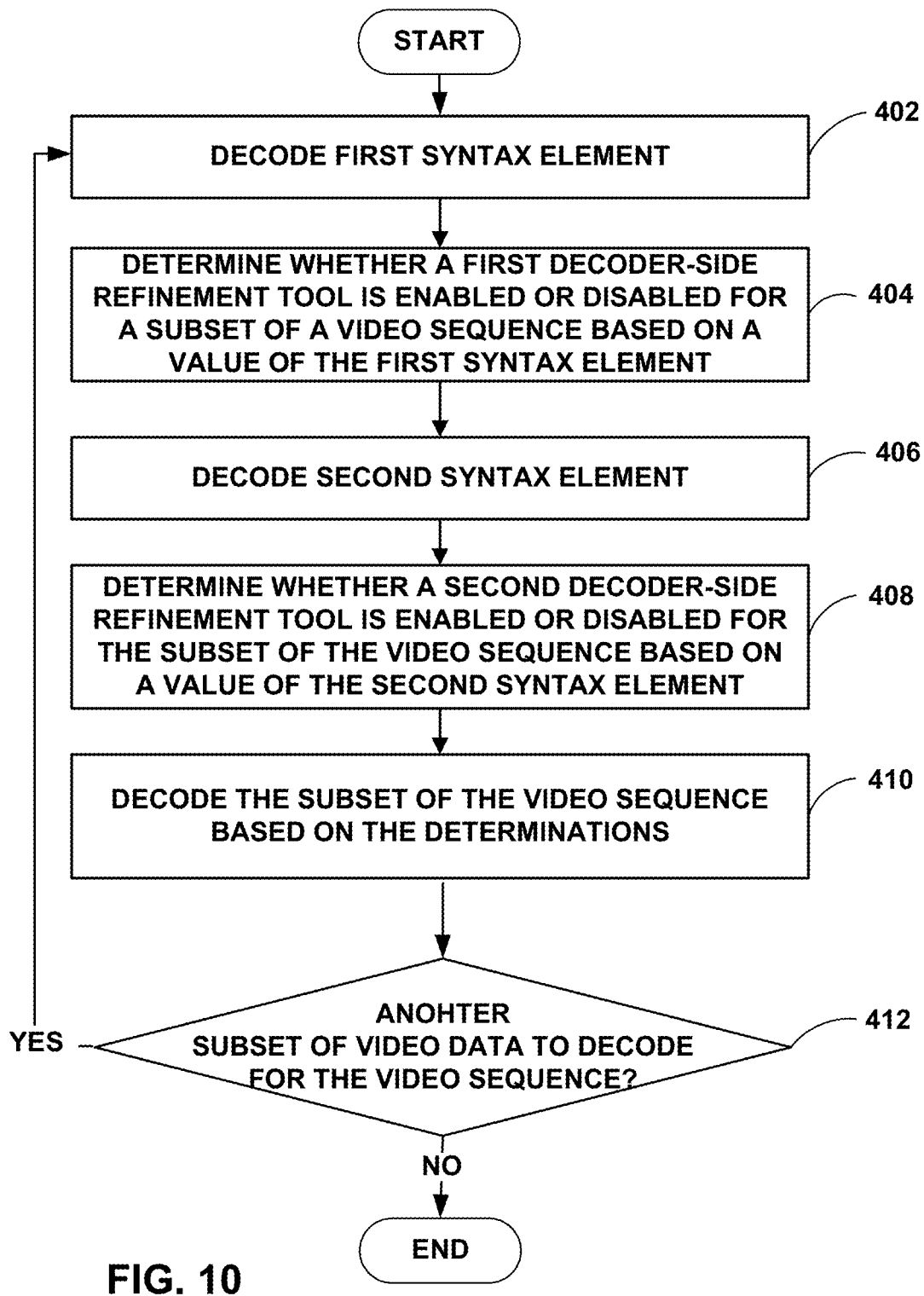
FIG. 10 is a flowchart illustrating another decoding method consistent with this disclosure.
Figure 11:
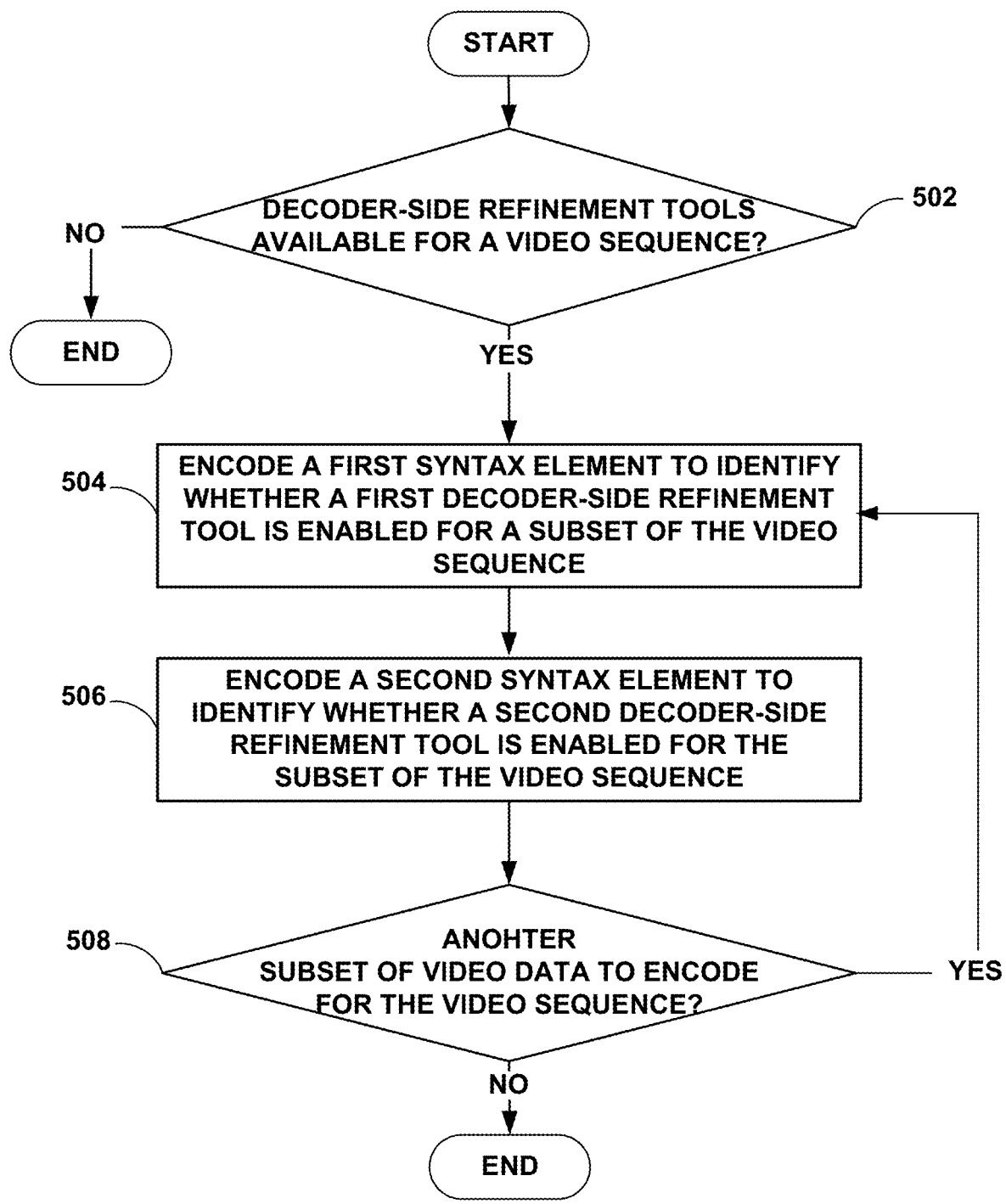
FIG. 11 is a flowchart illustrating another encoding method consistent with this disclosure.

In some examples consistent with FIG. 9, the decoding process (such as the step of predicting the current block (374)) may include the application of one or more decoder-side refinement tools. Therefore, the decoding process may include steps for decoding syntax elements as described herein that allow for enabling or disabling the decoder-side refinement tools for different subsets or portions of a larger video sequence. FIGS. 10 and 11 provide some additional details on examples for decoding and encoding different subsets of video data within a larger video sequence, where the different subsets (e.g., different slices, different pictures, different sub-pictures, different frames, different sets of pictures, different blocks, or other different subsets) have separately enabled or disabled decoder-side refinement tools.

As shown in FIG. 10, a video decoder 300 may include processing circuitry configured to decode a first syntax element (402) and determine based on a value of the first syntax element whether a first decoder side refinement tool is enabled or disabled for a subset of video data (404). For example, the first syntax element may comprise a flag or bit associated with a DMVR tool, and the subset of video data may comprise a portion (some but not all) of a video sequence that comprises a plurality of pictures of video data. In particular, the subset as described herein may comprise a slice of video data, a picture of video data, a sub-picture of video data, a frame of video data, a block of video data, or another sub-portion of video data within a video sequence. Video decoder 300 may be configured to decode a second syntax element (406) and determine based on a value of the second syntax element whether a second decoder side refinement tool is enabled or disabled for a subset of video data (404). For example, the second syntax element may comprise a flag or bit associated with a BDOF) tool. Video decoder 300 then decodes the subset (i.e., the slice, picture, sub-picture, frame, block, or other subset of a larger sequence) based on the determinations (410). For example, video decoder 300 may be configured to decode the subset of video data (e.g., a first subset of video data) using the first decoder-side refinement tool in response to the first decoder-side refinement tool being enabled for the first subset, decode the subset of video data without using the first decoder-side refinement tool in response to the first decoder-side refinement tool being disabled for the first subset, decode the subset of video data using the second decoder-side refinement tool in response to the second decoder-side refinement tool being enabled for the first subset, and decode the subset of video data without using the second decoder-side refinement tool in response to the second decoder-side refinement tool being disabled for the first subset.

Video decoder 300 may be configured to determine if there is another subset of video data to decode (412), e.g., another slice, picture, sub-picture, frame, block or other subset. If so, (yes branch of 412), the process repeats for a second subset of video data, e.g., for a different slice, picture, sub-picture, frame, block or other subset within the same video sequence that included the first subset of video data. In this example, the first step of decoding the first syntax element (404) may comprise decoding a first instance of the first syntax element and the first step of decoding the second syntax element (405) may comprise decoding a first instance of the second syntax element. Accordingly, video decoder 300 may (upon identifying another subset—"yes" branch of 412—), decode a second instance of the first syntax element (402) that identifies whether the first decoder-side refinement tool is enabled or disabled for a second subset of video data within the sequence of video data, wherein the second subset is different than the first subset. Video decoder 300 may then determine whether the first decoder-side refinement tool is enabled or disabled for the second subset of video data based on a value of the second instance of the first syntax element (404), decode a second instance of the second syntax element to determine whether the second decoder-side refinement tool is enabled or disabled for the second subset of video data within the sequence of video data (406), and determine whether the second decoder-side refinement tool is enabled or disabled for the second subset of video data based on a value of the second instance of the second syntax element (408).

Decoder 300 may be configured to decode the second subset of video data (410), which may include decoding the second subset of video data using the first decoder-side refinement tool in response to the first decoder-side refinement tool being enabled for the second subset, decoding the second subset of video data without using the first decoder-side refinement tool in response to the first decoder-side refinement tool being disabled for the second subset, decoding the second subset of video data using the second decoder-side refinement tool in response to the second decoder-side refinement tool being enabled for the second subset, and decoding the second subset of video data without using the second decoder-side refinement tool in response to the second decoder-side refinement tool being disabled for the second subset.

Video decoder 300 may be configured to again determine if there is another subset of video data to decode (412), e.g., another slice, picture, sub-picture, frame, block or other subset. If so, (yes branch of 412), the process repeats for a third subset of video data, e.g., for a different slice, picture, sub-picture, frame, block or other subset within the same video sequence that included the first subset of video data. Indeed, the process may repeat for many subsets of video data within a larger video sequence.

For the third subset of video data, for example, video decoder 300 may include processing circuitry configured to decode a third instance of the first syntax element (402) that indicates whether the first decoder-side refinement tool is enabled or disabled for a third subset of video data within the sequence of video data, wherein the third subset is different than the first subset and the third subset is different than the second subset. Video decoder may be further configured to determine whether the first decoder-side refinement tool is enabled or disabled for the third subset of video data based on a value of the third instance of the first syntax element (404), decode a third instance of the second syntax element that identifies whether the second decoder-side refinement tool is enabled or disabled for the third subset of video data within the sequence of video data (406), and determine whether the second decoder-side refinement tool is enabled or disabled for the third subset of video data based on a value of the third instance of the second syntax element (408) decoder 300 may decode the third subset of video data (410), which may include decoding the third subset of video data using the first decoder-side refinement tool in response to the first decoder-side refinement tool being enabled for the third subset, decoding the third subset of video data without using the first decoder-side refinement tool in response to the first decoder-side refinement tool being disabled for the third subset, decoding the third subset of video data using the second decoder-side refinement tool in response to the second decoder-side refinement tool being enabled for the third subset, and decoding the third subset of video data without using the second decoder-side refinement tool in response to the second decoder-side refinement tool being disabled for the third subset.

In this way, decoder-side refinement tools can be enabled or disabled many times for different subsets of data within a video sequence. For example, video decoder 300 may be configured to determine that a first decoder-side refinement tool is enabled for the first subset of video data based on a value of a first instance of a first syntax element, determine that a second decoder-side refinement tool is disabled for the first subset of video data based on a value of a first instance of a second syntax element, and decode the first subset of video data using the first decoder-side refinement tool and without using the second decoder-side refinement tool.

Then, for the same video sequence, video decoder 300 may be configured to determine that the first decoder-side refinement tool is disabled for a second subset of video data based on a value of a second instance of the first syntax element, determine that the second decoder-side refinement tool is enabled for the second subset of video data based on a value of a second instance of the second syntax element, and decode the second subset of video data using the second decoder-side refinement tool and without using the first decoder-side refinement tool.

The first and second decoder-side refinement tools may be generally available for decoding any of the plurality of pictures of a sequence of video data, but one or both the first and second decoder-side refinement tools may be enabled for some subsets of video data within the sequence of video data, while one or both of the first and second decoder-side refinement tools may be disabled for other subsets of video data within the sequence of video data.

In some examples, the general availability of decoder-side refinement tools may be defined at a sequence level, with more refined on/off control being available for subsets of the sequence (e.g., slices, blocks, pictures, sub-pictures, frames, or other subsets). For example, video decoder 300 may include processing circuitry configured to decode one or more syntax elements associated with the sequence of video data, and determine, based on the one or more syntax elements associated with the sequence of video data, that the first and second decoder-side refinement tools are enabled so as to be available for decoding the plurality of pictures of the sequence of video data. Then, video decoder 300 may perform the process of FIG. 10 for each of the subsets of video data within the sequence so that on/off control of the decoder-side refinement tools can be done at sub-sequence levels. In some examples, each subset of video data that has on/off control signaled for that subset may comprise at least a portion of a picture among the plurality of pictures of the sequence of video data. Again, as examples, the subset may comprise a slice of video data within the sequence, a frame of video data within the sequence, a picture among the plurality of pictures of the sequence of video data, a sub-picture of video data, or a block of video data within the sequence.

FIG. 11 is an example flow diagram illustrating an encoding technique consistent with this disclosure whereby two or more decoder-side refinement tools can be enabled or disabled for different portions or subsets of a video sequence that includes a plurality of pictures. As shown in FIG. 11, a video encoder 200 may be configured to determine whether decoder-side refinement tools are available for a video sequence (502). In some cases, the availability of decoder-side refinement tools is implied (and not signaled), and in some cases, video encoder 200 may be configured to encode one or more sequence level syntax elements to identify one or more decoder-side refinement tools that are available for use with the sequence. In any case, upon determining that one or more decoder-side refinement tools are available (yes branch of 502), video encoder 200 may encode a first syntax element to identify whether a first decoder-side refinement tool is enabled for a subset of a video sequence (504). In addition, video encoder 200 may be configured to encode a second syntax element to identify whether a second decoder-side refinement tool is enabled for a subset of a video sequence (506). Video encoder 200 may then determine if there is another subset of video data to encode for the sequence, and if so (yes branch of 508), video encoder 200 may repeat the steps of encoding the first and second syntax elements (504 and 506) for the next subset.

Accordingly, a video encoder 200 may comprise processing circuitry configured to encode a first instance of a first syntax element to identify whether a first decoder-side refinement tool is enabled or disabled for a first subset of video data within the sequence of video data (504), encode a second instance of the first syntax element to identify whether the first decoder-side refinement tool is enabled or disabled for a second subset of video data within the sequence of video data (506), wherein the second subset is different than the first subset, encode a first instance of a second syntax element to identify whether a second decoder-side refinement tool is enabled or disabled for a first subset of video data within the sequence of video data (504), and encode a second instance of the second syntax element to identify whether the second decoder-side refinement tool is enabled or disabled for a second subset of video data within the sequence of video data. Again, as examples, the first decoder-side refinement tool may comprise a DMVR tool and the second decoder-side refinement tool may comprise a BDOF tool.

Similarly, the process may repeat for other subsets of data within the video sequence, e.g., other frames, slices, pictures, sub-pictures, blocks, or other sub-portions (some but not all) of a video sequence. Accordingly, in some examples, video encoder 200 may encode a third instance of the first syntax element to identify whether the first decoder-side refinement tool is enabled or disabled for a third subset of video data within the sequence of video data (504), wherein the third subset is different than the first subset and the third subset is different than the second subset, and encode a third instance of the second syntax element to identify whether the second decoder-side refinement tool is enabled or disabled for the third subset of video data within the sequence of video data.

Thus, one or both the first and second decoder-side refinement tools may be enabled for some subsets of video data within the sequence of video data, and one or both of the first and second decoder-side refinement tools may be disabled for other subsets of video data within the sequence of video data.

In some examples, the general availability of decoder-side refinement tools may be defined at a sequence level, with more refined on/off control being available for subsets of the sequence (e.g., slices, blocks, pictures, sub-pictures, frames, or other subsets). For example, video encoder 200 may include processing circuitry configured to encode one or more syntax elements associated with the sequence of video data to indicate that the first and second decoder-side refinement tools are available for decoding the plurality of pictures of the sequence of video data. In these or other examples, as described herein, one or both the first and second decoder-side refinement tools may be enabled for some subsets of video data within the sequence of video data, and one or both of the first and second decoder-side refinement tools are disabled for other subsets of video data within the sequence of video data.

Again, a subset of video data may refer to at least a portion of a first picture among the plurality of pictures of the sequence of video data. The subset of video data, for example, may comprise one or more of a slice, a frame, a picture, a sub-picture, a block, or another portion (some but not all) of the video data within a video sequence.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Examples—The following examples may demonstrate one or more features or aspects consistent with this disclosure.

Example 1—A method includes coding a slice level syntax element indicating if a decoder-side motion refinement mode is on or off for a slice of video data, and coding blocks of video data in the slice of video data based on the slice level syntax element.

Example 2—A device includes a memory and one or more processors in communication with the memory, the one or more processors configured to code a slice level syntax element indicating if a decoder-side motion refinement mode is on or off for a slice of video data, and code blocks of video data in the slice of video data based on the slice level syntax element.

Example 3—A device includes means for coding a slice level syntax element indicating if a decoder-side motion refinement mode is on or off for a slice of video data, and means for coding blocks of video data in the slice of video data based on the slice level syntax element.

Example 4—A computer-readable storage medium is encoded with instructions that, when executed, cause a programmable processor to code a slice level syntax element indicating if a decoder-side motion refinement mode is on or off for a slice of video data, and code blocks of video data in the slice of video data based on the slice level syntax element.

Example 5—A method of coding video data, the method comprising: coding a slice level syntax element indicating if a decoder-side motion refinement mode is on or off for a slice of video data; and coding blocks of video data in the slice of video data based on the slice level syntax element.

Example 6—The method of example 5, wherein the decoder-side motion refinement mode is one of decoder-side motion vector refinement or bi-directional optical flow.

Example 7—The method of example 5 or 6, wherein coding the slice level syntax element indicating if the decoder-side motion refinement mode is on or off for a slice of video data comprises: coding a first slice level syntax element indicating if a decoder-side motion vector refinement mode is on or off for the slice of video data; and coding a second slice level syntax element indicating if a bi-directional optical flow mode is on or off for a slice of video data.

Example 8—A method of coding video data, the method comprising: coding a block level syntax element indicating if a decoder-side motion refinement mode is on or off for a block of video data; and coding the block of video data based on the block level syntax element.

Example 9—The method of example 8, wherein the decoder-side motion refinement mode is one of decoder-side motion vector refinement or bi-directional optical flow.

Example 10—The method of example 8, wherein the decoder-side motion refinement mode is both decoder-side motion vector refinement and bi-directional optical flow.

Example 11—The method of example 8, wherein the block of video data is a merge mode coding unit.

Example 12—The method of example 8, wherein coding the block level syntax element indicating if the decoder-side motion refinement mode is on or off for the block of video data comprises: coding the block level syntax element indicating if the decoder-side motion refinement mode is on or off for the block of video data in the case that a merge candidate index for the block of video data is within a predefined range.

Example 13—The method of example 8, wherein coding the block level syntax element indicating if the decoder-side motion refinement mode is on or off for the block of video data comprises: reusing a neighboring block level syntax element indicating if the decoder-side motion refinement mode is on or off from a neighboring block of video data for the block of video data.

Example 14—A method of coding video data, the method comprising: disabling a decoder-side motion refinement mode by applying a zero motion vector difference for a block of video data; and coding the block of video data using the zero motion vector.

Example 15—The method of example 14, wherein the block of video data is coded using merge mode with motion vector difference (MMVD).

Example 16—The method of example 14, wherein the decoder-side motion refinement mode is one of decoder-side motion vector refinement or bi-directional optical flow.

Example 17—The method of example 14, wherein disabling the decoder-side motion refinement mode by applying the zero motion vector difference for the block of video data comprises: disabling the decoder-side motion refinement mode by applying the zero motion vector difference for the block of video data based on one or more of a block size or a slice type.

Example 18—The method of example 14, further comprising: removing redundant candidates in a merge mode with motion vector difference (MMVD) candidate list.

Example 19—The method of any of examples 5-18, wherein coding comprises decoding.

Example 20—The method of any of examples 5-18, wherein coding comprises encoding.

Example 21—A device for coding video data, the device comprising one or more means for performing the method of any of examples 5-18.

Example 22—The device of example 21, wherein the one or more means comprise one or more processors implemented in circuitry.

Example 23—The device of example 21 or 22, further comprising a memory to store the video data.

Example 24—The device of any of examples 21-23, further comprising a display configured to display decoded video data.

Example 25—The device of any of examples 21-24, wherein the device comprises one or more of a camera, a computer, a mobile device, a broadcast receiver device, or a set-top box.

Example 26—The device of any of examples 21-25, wherein the device comprises a video decoder.

Example 27—The device of any of examples 21-25, wherein the device comprises a video encoder.

Example 28—A computer-readable storage medium having stored thereon instructions that, when executed, cause one or more processors to perform the method of any of examples 5-18.

Example 29—Any combination of techniques of examples 5-18.

Example 30—A method of decoding a plurality of pictures of a sequence of video data, the method comprising: decoding a first syntax element to determine whether a first decoder-side refinement tool is enabled for a first portion of a first picture among the plurality of pictures of the sequence of video data, the first decoder-side refinement tool having been enabled for decoding the plurality of pictures of the sequence of video data; determining that the first decoder-side refinement tool is enabled for the first portion of the first picture based on a value of the first syntax element; decoding a second syntax element to determine whether a second decoder-side refinement tool is enabled for the first portion of the first picture among the plurality of pictures of the sequence of video data, the second decoder-side refinement tool having been enabled for decoding the plurality of pictures of the sequence of video data; determining that the second decoder-side refinement tool is disabled for the first portion of the first picture based on a value of the first instance of the second syntax element; and decoding the first portion of the first picture using the first decoder-side refinement tool and without using the second decoder-side refinement tool.

Example 31—A method of decoding a sequence of video data that includes a plurality of pictures, the method comprising: decoding a first syntax element that indicates whether a first decoder-side refinement tool is enabled or disabled for a first subset of video data within the sequence of video data; determining whether the first decoder-side refinement tool is enabled or disabled for the first subset of video data based on a value of the first syntax element; decoding a second syntax element that indicates whether a second decoder-side refinement tool is enabled or disabled for the first subset of video data with the sequence of video data; determining whether the second decoder-side refinement tool is enabled or disabled for the first subset of video data based on a value of the first syntax element; decoding the first subset of video data using the first decoder-side refinement tool in response to the first decoder-side refinement tool being enabled for the first subset; decoding the first subset of video data without using the first decoder-side refinement tool in response to the first decoder-side refinement tool being disabled for the first subset; decoding the first subset of video data using the second decoder-side refinement tool in response to the second decoder-side refinement tool being enabled for the first subset; and decoding the first subset of video data without using the second decoder-side refinement tool in response to the second decoder-side refinement tool being disabled for the first subset.

Example 32—The method of example 31, wherein the first decoder-side refinement tool comprises a DMVR tool and wherein the second decoder-side refinement tool comprises a BDOF tool.

Example 33—The method of any combination of examples 30 and 31, wherein decoding the first syntax element comprises decoding a first instance of the first syntax element and wherein decoding the second syntax element comprises decoding a first instance of the second syntax element, the method further comprising: decoding a second instance of the first syntax element that indicates whether the first decoder-side refinement tool is enabled or disabled for a second subset of video data within the sequence of video data, wherein the second subset is different than the first subset; determining whether the first decoder-side refinement tool is enabled or disabled for the second subset of video data based on a value of the second instance of the first syntax element; decoding a second instance of the second syntax element that indicates whether the second decoder-side refinement tool is enabled or disabled for the second subset of video data within the sequence of video data; determining whether the second decoder-side refinement tool is enabled or disabled for the second subset of video data based on a value of the second instance of the second syntax element; decoding the second subset of video data using the first decoder-side refinement tool in response to the first decoder-side refinement tool being enabled for the second subset; decoding the second subset of video data without using the first decoder-side refinement tool in response to the first decoder-side refinement tool being disabled for the second subset; decoding the second subset of video data using the second decoder-side refinement tool in response to the second decoder-side refinement tool being enabled for the second subset; and decoding the second subset of video data without using the second decoder-side refinement tool in response to the second decoder-side refinement tool being disabled for the second subset.

Example 34—The method of any combinations of examples 31-33, further comprising: decoding a third instance of the first syntax element that indicates whether the first decoder-side refinement tool is enabled or disabled for a third subset of video data within the sequence of video data, wherein the third subset is different than the first subset and the third subset is different than the second subset; determining whether the first decoder-side refinement tool is enabled or disabled for the third subset of video data based on a value of the third instance of the first syntax element; decoding a third instance of the second syntax element that indicates whether the second decoder-side refinement tool is enabled or disabled for the third subset of video data within the sequence of video data; determining whether the second decoder-side refinement tool is enabled or disabled for the third subset of video data based on a value of the third instance of the second syntax element; decoding the third subset of video data using the first decoder-side refinement tool in response to the first decoder-side refinement tool being enabled for the third subset; decoding the third subset of video data without using the first decoder-side refinement tool in response to the first decoder-side refinement tool being disabled for the third subset; decoding the third subset of video data using the second decoder-side refinement tool in response to the second decoder-side refinement tool being enabled for the third subset; and decoding the third subset of video data without using the second decoder-side refinement tool in response to the second decoder-side refinement tool being disabled for the third subset.

Example 35—The method of any combinations of examples 31-34, further comprising: determining that the first decoder-side refinement tool is enabled for the first subset of video data based on a value of the first instance of the first syntax element; determining that the second decoder-side refinement tool is disabled for the first subset of video data based on a value of the first instance of the second syntax element; decoding the first subset of video data using the first decoder-side refinement tool and without using the second decoder-side refinement tool; determining that the first decoder-side refinement tool is disabled for the second subset of video data based on a value of the second instance of the first syntax element; determining that the second decoder-side refinement tool is enabled for the second subset of video data based on a value of the second instance of the second syntax element; and decoding the second subset of video data using the second decoder-side refinement tool and without using the first decoder-side refinement tool.

Example 36—The method of any combinations of examples 31-35, wherein the first and second decoder-side refinement tools are available for decoding any of the plurality of pictures of the sequence of video data, wherein one or both the first and second decoder-side refinement tools are enabled for some subsets of video data within the sequence of video data, and wherein one or both of the first and second decoder-side refinement tools are disabled for other subsets of video data within the sequence of video data.

Example 37—The method of any combinations of examples 31-36, further comprising: decoding one or more syntax elements associated with the sequence of video data; and determining, based on the one or more syntax elements associated with the sequence of video data, that the first and second decoder-side refinement tools are enabled so as to be available for decoding the plurality of pictures of the sequence of video data.

Example 38—The method of any combinations of examples 31-37, wherein the first subset comprises at least a portion of a first picture among the plurality of pictures of the sequence of video data.

Example 39—The method of any combinations of examples 31-38, wherein the first subset of video data within the sequence of video data comprises one or more of: a slice of video data; a frame of video data; a picture among the plurality of pictures of the sequence of video data; a sub-picture, and a block of video data.

Example 40—A method of encoding a sequence of video data that includes a plurality of pictures, the method comprising: encoding a first instance of a first syntax element to identify whether a first decoder-side refinement tool is enabled or disabled for a first subset of video data within the sequence of video data; encoding a second instance of the first syntax element to identify whether the first decoder-side refinement tool is enabled or disabled for a second subset of video data within the sequence of video data, wherein the second subset is different than the first subset; encoding a first instance of a second syntax element to identify whether a second decoder-side refinement tool is enabled or disabled for a first subset of video data within the sequence of video data; and encoding a second instance of the second syntax element to identify whether the second decoder-side refinement tool is enabled or disabled for a second subset of video data within the sequence of video data.

Example 41—The method of example 40, wherein the first decoder-side refinement tool comprises a DMVR tool and wherein the second decoder-side refinement tool comprises a BDOF tool.

Example 42—The method of any combinations of examples 40-41, further comprising: encoding a third instance of the first syntax element to identify whether the first decoder-side refinement tool is enabled or disabled for a third subset of video data within the sequence of video data, wherein the third subset is different than the first subset and the third subset is different than the second subset; and encoding a third instance of the second syntax element to identify whether the second decoder-side refinement tool is enabled or disabled for the third subset of video data within the sequence of video data.

Example 43—The method of any combinations of examples 40-42, wherein one or both the first and second decoder-side refinement tools are enabled for some subsets of video data within the sequence of video data, and wherein one or both of the first and second decoder-side refinement tools are disabled for other subsets of video data within the sequence of video data.

Example 44—The method any combination of examples 40-43, further comprising: encoding one or more syntax elements associated with the sequence of video data to indicate that the first and second decoder-side refinement tools are available for decoding the plurality of pictures of the sequence of video data, wherein one or both the first and second decoder-side refinement tools are enabled for some subsets of video data within the sequence of video data, and wherein one or both of the first and second decoder-side refinement tools are disabled for other subsets of video data within the sequence of video data.

Example 45—The method any combination of examples 40-44, wherein the first subset comprises at least a portion of a first picture among the plurality of pictures of the sequence of video data.

Example 46—The method any combination of examples 40-45, wherein the first subset of video data within the sequence of video data comprises one or more of: a slice; a frame; a picture; a sub-picture, and a block.

Example 47—A video decoding device comprising: a memory configured to store a sequence of video data that includes a plurality of pictures; and processing circuitry configured to: decode a first syntax element that indicates whether a first decoder-side refinement tool is enabled or disabled for a first subset of video data within the sequence of video data; determine whether the first decoder-side refinement tool is enabled or disabled for the first subset of video data based on a value of the first syntax element; decode a second syntax element that indicates whether a second decoder-side refinement tool is enabled or disabled for the first subset of video data with the sequence of video data; determine whether the second decoder-side refinement tool is enabled or disabled for the first subset of video data based on a value of the first syntax element; decode the first subset of video data using the first decoder-side refinement tool in response to the first decoder-side refinement tool being enabled for the first subset; decode the first subset of video data without using the first decoder-side refinement tool in response to the first decoder-side refinement tool being disabled for the first subset; decode the first subset of video data using the second decoder-side refinement tool in response to the second decoder-side refinement tool being enabled for the first subset; and decode the first subset of video data without using the second decoder-side refinement tool in response to the second decoder-side refinement tool being disabled for the first subset.

Example 48—The video decoding device of example 47, wherein the first decoder-side refinement tool comprises a DMVR tool and wherein the second decoder-side refinement tool comprises a BDOF tool.

Example 49—The video decoding device of examples 47 or 48, wherein the processing circuitry is configured to decode the first syntax element by decoding a first instance of the first syntax element and to decode the second syntax element by decoding a first instance of the second syntax element, the processing circuitry being further configured to: decode a second instance of the first syntax element that indicates whether the first decoder-side refinement tool is enabled or disabled for a second subset of video data within the sequence of video data, wherein the second subset is different than the first subset; determine whether the first decoder-side refinement tool is enabled or disabled for the second subset of video data based on a value of the second instance of the first syntax element; decode a second instance of the second syntax element that indicates whether the second decoder-side refinement tool is enabled or disabled for the second subset of video data within the sequence of video data; determine whether the second decoder-side refinement tool is enabled or disabled for the second subset of video data based on a value of the second instance of the second syntax element; decode the second subset of video data using the first decoder-side refinement tool in response to the first decoder-side refinement tool being enabled for the second subset; decode the second subset of video data without using the first decoder-side refinement tool in response to the first decoder-side refinement tool being disabled for the second subset; decode the second subset of video data using the second decoder-side refinement tool in response to the second decoder-side refinement tool being enabled for the second subset; and decode the second subset of video data without using the second decoder-side refinement tool in response to the second decoder-side refinement tool being disabled for the second subset.

Example 50—The video coding device of any combination of examples 47-49, wherein the processing circuitry is further configured to: decode a third instance of the first syntax element that indicates whether the first decoder-side refinement tool is enabled or disabled for a third subset of video data within the sequence of video data, wherein the third subset is different than the first subset and the third subset is different than the second subset; determine whether the first decoder-side refinement tool is enabled or disabled for the third subset of video data based on a value of the third instance of the first syntax element; decode a third instance of the second syntax element that indicates whether the second decoder-side refinement tool is enabled or disabled for the third subset of video data within the sequence of video data; determine whether the second decoder-side refinement tool is enabled or disabled for the third subset of video data based on a value of the third instance of the second syntax element; decode the third subset of video data using the first decoder-side refinement tool in response to the first decoder-side refinement tool being enabled for the third subset; decode the third subset of video data without using the first decoder-side refinement tool in response to the first decoder-side refinement tool being disabled for the third subset; decode the third subset of video data using the second decoder-side refinement tool in response to the second decoder-side refinement tool being enabled for the third subset; and decode the third subset of video data without using the second decoder-side refinement tool in response to the second decoder-side refinement tool being disabled for the third subset.

Example 51—The video coding device of any combination of examples 47-50, wherein the processing circuitry is configured to: determine that the first decoder-side refinement tool is enabled for the first subset of video data based on a value of the first instance of the first syntax element; determine that the second decoder-side refinement tool is disabled for the first subset of video data based on a value of the first instance of the second syntax element; decode the first subset of video data using the first decoder-side refinement tool and without using the second decoder-side refinement tool; determine that the first decoder-side refinement tool is disabled for the second subset of video data based on a value of the second instance of the first syntax element; determine that the second decoder-side refinement tool is enabled for the second subset of video data based on a value of the second instance of the second syntax element; and decode the second subset of video data using the second decoder-side refinement tool and without using the first decoder-side refinement tool.

Example 52—The video coding device of any combination of examples 47-51, wherein the first and second decoder-side refinement tools are available for decoding any of the plurality of pictures of the sequence of video data, wherein one or both the first and second decoder-side refinement tools are enabled for some subsets of video data within the sequence of video data, and wherein one or both of the first and second decoder-side refinement tools are disabled for other subsets of video data within the sequence of video data.

Example 53—The video coding device of any combination of examples 47-52, wherein the processing circuitry is further configured to: decode one or more syntax elements associated with the sequence of video data; and determine, based on the one or more syntax elements associated with the sequence of video data, that the first and second decoder-side refinement tools are enabled so as to be available for decoding the plurality of pictures of the sequence of video data.

Example 54—The video coding device of any combination of examples 47-53, wherein the first subset comprises at least a portion of a first picture among the plurality of pictures of the sequence of video data.

Example 55—The video coding device of any combination of examples 47-54, wherein the first subset of video data within the sequence of video data comprises one or more of: a slice of video data; a frame of video data; a picture among the plurality of pictures of the sequence of video data; a sub-picture, and a block of video data.

Example 56—A video encoding device comprising: a memory configured to store a sequence of video data that includes a plurality of pictures; and processing circuitry configured to: encode a first instance of a first syntax element to identify whether a first decoder-side refinement tool is enabled or disabled for a first subset of video data within the sequence of video data; encode a second instance of the first syntax element to identify whether the first decoder-side refinement tool is enabled or disabled for a second subset of video data within the sequence of video data, wherein the second subset is different than the first subset; encode a first instance of a second syntax element to identify whether a second decoder-side refinement tool is enabled or disabled for a first subset of video data within the sequence of video data; and encode a second instance of the second syntax element to identify whether the second decoder-side refinement tool is enabled or disabled for a second subset of video data within the sequence of video data.

Example 57—The video encoding device of example 56, wherein the first decoder-side refinement tool comprises a DMVR tool and wherein the second decoder-side refinement tool comprises a BDOF tool.

Example 58—The video encoding device of example 56 or 57, wherein the processing circuitry is further configured to: encode a third instance of the first syntax element to identify whether the first decoder-side refinement tool is enabled or disabled for a third subset of video data within the sequence of video data, wherein the third subset is different than the first subset and the third subset is different than the second subset; and encode a third instance of the second syntax element to identify whether the second decoder-side refinement tool is enabled or disabled for the third subset of video data within the sequence of video data.

Example 59—The video encoding device of any combination of examples 56-58, wherein one or both the first and second decoder-side refinement tools are enabled for some subsets of video data within the sequence of video data, and wherein one or both of the first and second decoder-side refinement tools are disabled for other subsets of video data within the sequence of video data.

Example 60—The video encoding device of any combination of examples 56-59, wherein the processing circuitry is further configured to: encode one or more syntax elements associated with the sequence of video data to indicate that the first and second decoder-side refinement tools are available for decoding the plurality of pictures of the sequence of video data, wherein one or both the first and second decoder-side refinement tools are enabled for some subsets of video data within the sequence of video data, and wherein one or both of the first and second decoder-side refinement tools are disabled for other subsets of video data within the sequence of video data.

Example 61—The video encoding device of any combination of examples 56-60, wherein the first subset comprises at least a portion of a first picture among the plurality of pictures of the sequence of video data.

Example 62—The video encoding device of any combination of examples 56-61, wherein the first subset of video data within the sequence of video data comprises one or more of: a slice; a frame; a picture; a sub-picture; and a block.

Example 63—A video decoding device configured to decode a sequence of video data that includes a plurality of pictures, the video decoding device comprising: means for decoding a first syntax element that indicates whether a first decoder-side refinement tool is enabled or disabled for a first subset of video data within the sequence of video data; means for determining whether the first decoder-side refinement tool is enabled or disabled for the first subset of video data based on a value of the first syntax element; means for decoding a second syntax element that indicates whether a second decoder-side refinement tool is enabled or disabled for the first subset of video data with the sequence of video data; means for determining whether the second decoder-side refinement tool is enabled or disabled for the first subset of video data based on a value of the first syntax element; means for decoding the first subset of video data using the first decoder-side refinement tool in response to the first decoder-side refinement tool being enabled for the first subset; means for decoding the first subset of video data without using the first decoder-side refinement tool in response to the first decoder-side refinement tool being disabled for the first subset; means for decoding the first subset of video data using the second decoder-side refinement tool in response to the second decoder-side refinement tool being enabled for the first subset; and means for decoding the subset of video data without using the second decoder-side refinement tool in response to the second decoder-side refinement tool being disabled for the first subset.

Example 64—A video encoding device configured to encode a sequence of video data that includes a plurality of pictures, the video encoding device comprising: means for encoding a first instance of a first syntax element to identify whether a first decoder-side refinement tool is enabled or disabled for a first subset of video data within the sequence of video data; means for encoding a second instance of the first syntax element to identify whether the first decoder-side refinement tool is enabled or disabled for a second subset of video data within the sequence of video data, wherein the second subset is different than the first subset; means for encoding a first instance of a second syntax element to identify whether a second decoder-side refinement tool is enabled or disabled for a first subset of video data within the sequence of video data; and means for encoding a second instance of the second syntax element to identify whether the second decoder-side refinement tool is enabled or disabled for a second subset of video data within the sequence of video data.

Example 65—A computer-readable storage medium storing instructions that, when executed, cause one or more processors of a video decoding device to: decode a first syntax element that indicates whether a first decoder-side refinement tool is enabled or disabled for a first subset of video data within a sequence of video data, wherein the sequence of video data that includes a plurality of pictures; determine whether the first decoder-side refinement tool is enabled or disabled for the first subset of video data based on a value of the first syntax element; decode a second syntax element that indicates whether a second decoder-side refinement tool is enabled or disabled for the first subset of video data with the sequence of video data; determine whether the second decoder-side refinement tool is enabled or disabled for the first subset of video data based on a value of the first syntax element; decode the first subset of video data using the first decoder-side refinement tool in response to the first decoder-side refinement tool being enabled for the first subset; decode the first subset of video data without using the first decoder-side refinement tool in response to the first decoder-side refinement tool being disabled for the first subset; decode the first subset of video data using the second decoder-side refinement tool in response to the second decoder-side refinement tool being enabled for the first subset; and decode the subset of video data without using the second decoder-side refinement tool in response to the second decoder-side refinement tool being disabled for the first subset.

Example 66—A computer-readable storage medium storing instructions that, when executed, cause one or more processors of a video encoding device to: encode a first instance of a first syntax element to identify whether a first decoder-side refinement tool is enabled or disabled for a first subset of video data within a sequence of video data wherein the sequence of video data that includes a plurality of pictures; encode a second instance of the first syntax element to identify whether the first decoder-side refinement tool is enabled or disabled for a second subset of video data within the sequence of video data, wherein the second subset is different than the first subset; encode a first instance of a second syntax element to identify whether a second decoder-side refinement tool is enabled or disabled for a first subset of video data within the sequence of video data; and encode a second instance of the second syntax element to identify whether the second decoder-side refinement tool is enabled or disabled for a second subset of video data within the sequence of video data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding a sequence of video data that includes a plurality of pictures, the method comprising:
    decoding a first syntax element that indicates whether a first decoder-side refinement tool is enabled or disabled for a first portion of a first picture among the plurality of pictures within the sequence of video data;
    determining that the first decoder-side refinement tool is enabled for the first portion of the first picture based on a value of the first syntax element;
    decoding a second syntax element that indicates whether a second decoder-side refinement tool is enabled or disabled for the first portion of the first picture, wherein the first decoder side-refinement tool and the second decoder-side refinement tool are enabled for refining motion information associated with the plurality of pictures;
    determining that the second decoder-side refinement tool is disabled for the first portion of the first picture based on a value of the second syntax element; and
    decoding the first portion of the first picture using the first decoder side refinement tool in response to determining that the first decoder-side refinement tool is enabled for the first portion of the first picture and in response to determining that the second decoder side refinement tool is disabled for the first portion of the first picture.

2. The method of claim 1, wherein the first decoder-side refinement tool comprises a decoder-side motion vector refinement (DMVR) tool and wherein the second decoder-side refinement tool comprises a bi-directional optical flow (BDOF) tool.

3. The method of claim 1, wherein decoding the first syntax element comprises decoding a first instance of the first syntax element and wherein decoding the second syntax element comprises decoding a first instance of the second syntax element, the method further comprising:
    decoding a second instance of the first syntax element that indicates whether the first decoder-side refinement tool is enabled or disabled for a first portion of a second picture among the plurality of pictures within the sequence of video data, wherein the second picture among the plurality of pictures is different than the first picture among the plurality of pictures;
    determining that the first decoder-side refinement tool is disabled for the first portion of the second picture based on a value of the second instance of the first syntax element;
    decoding a second instance of the second syntax element that indicates whether the second decoder-side refinement tool is enabled or disabled for the first portion of the second picture among the plurality of pictures within the sequence of video data;
    determining that the second decoder-side refinement tool is enabled for the first portion of the second picture based on a value of the second instance of the second syntax element; and
    decoding the first portion of the second picture using the second decoder-side refinement tool in response to determining that the first decoder-side refinement tool is disabled and the second decoder-side refinement tool is enabled for the first portion of the second picture among the plurality of pictures.

4. The method of claim 3, further comprising:
    decoding a third instance of the first syntax element that indicates whether the first decoder-side refinement tool is enabled or disabled for a first portion of a third picture among the plurality of pictures within the sequence of video data, wherein the third picture is different than the first picture and the third picture is different than the second picture;
    determining that the first decoder-side refinement tool is enabled for the first portion of the third picture based on a value of the third instance of the first syntax element;
    decoding a third instance of the second syntax element that indicates whether the second decoder-side refinement tool is enabled or disabled for the first portion of the third picture among the plurality of pictures within the sequence of video data;
    determining that the second decoder-side refinement tool is enabled for the first portion of the third picture based on a value of the third instance of the second syntax element; and
    decoding the first portion of the third picture using the first decoder-side refinement tool and the second decoder-side refinement tool in response to determining that the first decoder-side refinement tool is enabled for the first portion of the third picture and the second decoder-side refinement tool is enabled for the first portion of the third picture.

5. The method of claim 1, further comprising:
   determining that the first decoder-side refinement tool is enabled for the first portion of the first picture among the plurality of pictures based on a value of a first instance of the first syntax element; and
   determining that the second decoder-side refinement tool is disabled for the first portion of the first picture among the plurality of pictures based on a value of a first instance of the second syntax element.

6. The method of claim 1, wherein the first and second decoder-side refinement tools are available for decoding any of the plurality of pictures of the sequence of video data, wherein one or both the first and second decoder-side refinement tools are enabled for some portions of pictures among the plurality of pictures within the sequence of video data, and wherein one or both of the first and second decoder-side refinement tools are disabled for other portions of pictures among the plurality of pictures within the sequence of video data.

7. The method of claim 1, further comprising:
   decoding one or more syntax elements associated with the sequence of video data; and
   determining, based on the one or more syntax elements associated with the sequence of video data, that the first and second decoder-side refinement tools are enabled for the sequence of video data so as to be available for decoding the plurality of pictures of the sequence of video data.

8. The method of claim 1, wherein the first portion of the first picture comprises one of:
   a slice of video data;
   a frame of video data;
   a picture among the plurality of pictures of the sequence of video data;
   a sub-picture of video data; and
   a block of video data.

9. A method of encoding a sequence of video data that includes a plurality of pictures, the method comprising:
   encoding a first instance of a first syntax element to identify that a first decoder-side refinement tool is enabled for a first portion of a first picture among the plurality of pictures within the sequence of video data;
   encoding a second instance of the first syntax element to identify that the first decoder-side refinement tool is disabled for a first portion of a second picture among the plurality of pictures within the sequence of video data, wherein the second picture is different than the first picture, and wherein the first decoder side-refinement tool and the second decoder-side refinement tool are enabled for refining motion information associated with the plurality of pictures;
   encoding a first instance of a second syntax element to identify that a second decoder-side refinement tool is disabled for the first portion of the first picture among the plurality of pictures within the sequence of video data; and
   encoding a second instance of the second syntax element to identify that the second decoder-side refinement tool is enabled for the first portion of the second picture among the plurality of pictures within the sequence of video data.

10. The method of claim 9, wherein the first decoder-side refinement tool comprises a decoder-side motion vector refinement (DMVR) tool and wherein the second decoder-side refinement tool comprises a bi-directional optical flow (BDOF) tool.

11. The method of claim 9, further comprising:
    encoding a third instance of the first syntax element to identify that the first decoder-side refinement tool is enabled for a first portion of a third picture among the plurality of pictures within the sequence of video data, wherein the third picture is different than the first picture subset and the third picture is different than the second picture; and
    encoding a third instance of the second syntax element to identify that the second decoder-side refinement tool is enabled for the first portion of the third picture among the plurality of pictures within the sequence of video data.

12. The method of claim 9, wherein one or both the first and second decoder-side refinement tools are enabled for some portions of pictures among the plurality of pictures within the sequence of video data, and wherein one or both of the first and second decoder-side refinement tools are disabled for other portions of pictures among the plurality of pictures within the sequence of video data.

13. The method of claim 9, further comprising:
    encoding one or more syntax elements associated with the sequence of video data to indicate that the first and second decoder-side refinement tools are enabled for the sequence of video data,
    wherein one or both the first and second decoder-side refinement tools are enabled for some portions of pictures among the plurality of pictures within the sequence of video data, and wherein one or both of the first and second decoder-side refinement tools are disabled for other portions of pictures among the plurality of pictures within the sequence of video data.

14. The method of claim 9, wherein the first portion of the first picture among the plurality of pictures comprises one or more of:
    a slice;
    a frame;
    a picture;
    a sub-picture; and
    a block.

15. A video decoding device comprising:
    a memory configured to store a sequence of video data that includes a plurality of pictures; and
    processing circuitry configured to:
    decode a first syntax element that indicates whether a first decoder-side refinement tool is enabled or disabled for a first portion of a first picture among the plurality of pictures within the sequence of video data;
    determine that the first decoder-side refinement tool is enabled for the first portion of the first picture based on a value of the first syntax element;
    decode a second syntax element that indicates whether a second decoder-side refinement tool is enabled or disabled for the first portion of the first picture among the plurality of pictures with the sequence of video data wherein the first decoder side-refinement tool and the second decoder-side refinement tool are enabled for refining motion information associated with the plurality of pictures;
    determine that the second decoder-side refinement tool is disabled for the first portion of the first picture based on a value of the second syntax element; and decode the first portion of the first picture using the first decoder side refinement tool in response to determining that the first decoder-side refinement tool is enabled and in response to determining that the second decoder side refinement tool is disabled for the portion of the first picture.

16. The video decoding device of claim 15, wherein the first decoder-side refinement tool comprises a decoder-side motion vector refinement (DMVR) tool and wherein the second decoder-side refinement tool comprises a bi-directional optical flow (BDOF) tool.

17. The video decoding device of claim 15, wherein the processing circuitry is configured to decode the first syntax element by decoding a first instance of the first syntax element and to decode the second syntax element by decoding a first instance of the second syntax element, the processing circuitry being further configured to:
decode a second instance of the first syntax element that indicates whether the first decoder-side refinement tool is enabled or disabled for a first portion of a second picture among the plurality of pictures within the sequence of video data, wherein the second picture is different than the first picture;
determine that the first decoder-side refinement tool is disabled for the first portion of the second picture based on a value of the second instance of the first syntax element;
decode a second instance of the second syntax element that indicates whether the second decoder-side refinement tool is enabled or disabled for the first portion of the second picture among the plurality of pictures within the sequence of video data;
determine that the second decoder-side refinement tool is enabled for the first portion of the second picture based on a value of the second instance of the second syntax element; and
decode the first portion of the second picture using the second decoder-side refinement tool in response to determining that the first decoder-side refinement tool is disabled and the second decoder-side refinement tool is enabled for the first portion of the second picture.

18. The video coding device of claim 17, wherein the processing circuitry is further configured to:
decode a third instance of the first syntax element that indicates whether the first decoder-side refinement tool is enabled or disabled for a first portion of a third picture among the plurality of pictures within the sequence of video data, wherein the third picture is different than the first picture and the third picture is different than the second picture;
determine that the first decoder-side refinement tool is enabled for the first portion of the third picture based on a value of the third instance of the first syntax element;
decode a third instance of the second syntax element that indicates whether the second decoder-side refinement tool is enabled or disabled for the first portion of the third picture among the plurality of pictures within the sequence of video data;
determine that the second decoder-side refinement tool is enabled for the first portion of the third picture based on a value of the third instance of the second syntax element; and
decode the first portion of the third picture using the first decoder-side refinement tool and the second decoder-side refinement tool in response to determining that the first decoder-side refinement tool is enabled for the first portion of the third picture and in response to determining that the second decoder-side refinement tool is enabled for the first portion of the third picture.

19. The video decoding device of claim 15, wherein the processing circuitry is configured to:
determine that the first decoder-side refinement tool is enabled for the first portion of the first picture among the plurality of pictures based on a value of a first instance of the first syntax element;
determine that the second decoder-side refinement tool is disabled for the first portion of the first picture among the plurality of pictures based on a value of a first instance of the second syntax element.

20. The video decoding device of claim 15, wherein the first and second decoder-side refinement tools are available for decoding any of the plurality of pictures of the sequence of video data, wherein one or both the first and second decoder-side refinement tools are enabled for some portions of the pictures among the plurality of pictures within the sequence of video data, and wherein one or both of the first and second decoder-side refinement tools are disabled for other portions of pictures among the plurality of pictures within the sequence of video data.

21. The video decoding device of claim 15, wherein the processing circuitry is further configured to:
decode one or more syntax elements associated with the sequence of video data; and
determine, based on the one or more syntax elements associated with the sequence of video data, that the first and second decoder-side refinement tools are enabled for the sequence of video data so as to be available for decoding the plurality of pictures of the sequence of video data.

22. The video decoding device of claim 17, wherein the first portion of the first picture comprises one of:
a slice of video data;
a frame of video data;
a picture among the plurality of pictures of the sequence of video data;
a sub-picture of video data; and
a block of video data.

23. A video encoding device comprising:
a memory configured to store a sequence of video data that includes a plurality of pictures; and
processing circuitry configured to:
encode a first instance of a first syntax element to identify that a first decoder-side refinement tool is enabled for a first portion of a first picture among the plurality of pictures within the sequence of video data;
encode a second instance of the first syntax element to identify that the first decoder-side refinement tool is disabled for a first portion of a second picture among the plurality of pictures within the sequence of video data, wherein the second picture is different than the first picture, and wherein the first decoder side-refinement tool and the second decoder-side refinement tool are enabled for refining motion information associated with the plurality of pictures;
encode a first instance of a second syntax element to identify that a second decoder-side refinement tool is disabled for a first portion of a first picture among the plurality of pictures within the sequence of video data; and
encode a second instance of the second syntax element to identify that the second decoder-side refinement tool is enabled for a first portion of a second picture among the plurality of pictures within the sequence of video data.

24. The video encoding device of claim 23, wherein the first decoder-side refinement tool comprises a decoder-side motion vector refinement (DMVR) tool and wherein the second decoder-side refinement tool comprises a bi-directional optical flow (BDOF) tool.

25. The video encoding device of claim 23, wherein the processing circuitry is further configured to:
  encode a third instance of the first syntax element to identify that the first decoder-side refinement tool is enabled for a first portion of a third picture among the plurality of pictures within the sequence of video data, wherein the third picture is different than the first picture and the third picture is different than the second picture; and
  encode a third instance of the second syntax element to identify that the second decoder-side refinement tool is enabled for the first portion of the third picture among the plurality of pictures within the sequence of video data.

26. The video encoding device of claim 23, wherein one or both the first and second decoder-side refinement tools are enabled for some portions of pictures among the plurality of pictures within the sequence of video data, and wherein one or both of the first and second decoder-side refinement tools are disabled for other portions of pictures among the plurality of pictures within the sequence of video data.

27. The video encoding device of claim 23, wherein the processing circuitry is further configured to:
  encode one or more syntax elements associated with the sequence of video data to indicate that the first and second decoder-side refinement tools are enabled for the sequence of video data,
  wherein one or both the first and second decoder-side refinement tools are enabled for some portions of pictures among the plurality of pictures within the sequence of video data, and wherein one or both of the first and second decoder-side refinement tools are disabled for other portions of pictures among the plurality of pictures within the sequence of video data.

28. The video encoding device of claim 23, wherein the first portion of the first picture comprises one of:
  a slice;
  a frame;
  a picture;
  a sub-picture; and
  a block.

29. A video decoding device configured to decode a sequence of video data that includes a plurality of pictures, the video decoding device comprising:
  means for decoding a first syntax element that indicates whether a first decoder-side refinement tool is enabled or disabled for a first portion of a first picture among the plurality of pictures within the sequence of video data;
  means for determining that the first decoder-side refinement tool is enabled for the first portion of the first picture based on a value of the first syntax element;
  means for decoding a second syntax element that indicates whether a second decoder-side refinement tool is enabled or disabled for the first portion of the first picture among the plurality of pictures with the sequence of video data, wherein the first decoder side-refinement tool and the second decoder-side refinement tool are enabled for refining motion information associated with the plurality of pictures;
  means for determining that the second decoder-side refinement tool is disabled for the first portion of the first picture based on a value of the second syntax element;
  means for decoding the first portion of the first picture using the first decoder side refinement tool in response to determining that the first decoder-side refinement tool is enabled and in response to determining that the second decoder side refinement tool is disabled for the first portion of the first picture among the plurality of pictures.

30. A video encoding device configured to encode a sequence of video data that includes a plurality of pictures, the video encoding device comprising:
  means for encoding a first instance of a first syntax element to identify that a first decoder-side refinement tool is enabled for a first portion of a first picture among the plurality of pictures within the sequence of video data;
  means for encoding a second instance of the first syntax element to identify that the first decoder-side refinement tool is disabled for a first portion of a second picture among the plurality of pictures within the sequence of video data, wherein the second picture is different than the first picture, and wherein the first decoder side-refinement tool and the second decoder-side refinement tool are enabled for refining motion information associated with the plurality of pictures;
  means for encoding a first instance of a second syntax element to identify that a second decoder-side refinement tool is disabled for a first portion of a second picture among the plurality of pictures within the sequence of video data; and
  means for encoding a second instance of the second syntax element to identify that the second decoder-side refinement tool is enabled for the first portion of the second picture among the plurality of pictures within the sequence of video data.

31. A non-transitory computer-readable storage medium storing instructions that, when executed, cause one or more processors of a video decoding device to:
  decode a first syntax element that indicates whether a first decoder-side refinement tool is enabled or disabled for a first portion of a first picture among a plurality of pictures within a sequence of video data;
  determine that the first decoder-side refinement tool is enabled for the first portion of the first picture based on a value of the first syntax element;
  decode a second syntax element that indicates whether a second decoder-side refinement tool is enabled or disabled for the first portion of the first picture among the plurality of pictures with the sequence of video data, wherein the first decoder side-refinement tool and the second decoder-side refinement tool are enabled for refining motion information associated with the plurality of pictures;
  determine that the second decoder-side refinement tool is disabled for the first portion of the first picture based on a value of the second syntax element;
  decode the first portion of the first picture using the first decoder side refinement tool in response to determining that the first decoder-side refinement tool is enabled and in response to determining that the second decoder side refinement tool is disabled for the first portion of the first picture among the plurality of pictures.

32. A non-transitory computer-readable storage medium storing instructions that, when executed, cause one or more processors of a video encoding device to:
- encode a first instance of a first syntax element to identify that a first decoder-side refinement tool is enabled for a first portion of a first picture among a plurality of pictures within a sequence of video data;
- encode a second instance of the first syntax element to identify that the first decoder-side refinement tool is disabled for a first portion of a second picture among the plurality of pictures within the sequence of video data, wherein the second picture is different than the first picture, and wherein the first decoder side-refinement tool and the second decoder-side refinement tool are enabled for refining motion information associated with the plurality of pictures;
- encode a first instance of a second syntax element to identify that a second decoder-side refinement tool is disabled for the first portion of the first picture among the plurality of pictures within the sequence of video data; and
- encode a second instance of the second syntax element to identify that the second decoder-side refinement tool is enabled for the first portion of the second picture among the plurality of pictures within the sequence of video data.

* * * * *